(12) United States Patent
Miyake et al.

(10) Patent No.: US 10,708,117 B2
(45) Date of Patent: Jul. 7, 2020

(54) NETWORK SYSTEM, CONTROL METHOD, AND CONTROL DEVICE

(71) Applicant: OMRON Corporation, Kyoto (JP)

(72) Inventors: Kazunari Miyake, Omihachiman (JP); Kenichi Iwami, Sakai (JP); Yutaka Tahara, Ritto (JP)

(73) Assignee: OMRON Corporation, Kyoto (JP)

( * ) Notice: Subject to any disclaimer, the term of this patent is extended or adjusted under 35 U.S.C. 154(b) by 53 days.

(21) Appl. No.: 16/159,738

(22) Filed: Oct. 15, 2018

(65) Prior Publication Data

US 2019/0238395 A1  Aug. 1, 2019

(30) Foreign Application Priority Data

Jan. 29, 2018 (JP) ................. 2018-012369

(51) Int. Cl.
*G06F 15/173* (2006.01)
*H04L 12/24* (2006.01)
*H04L 12/403* (2006.01)

(52) U.S. Cl.
CPC .......... *H04L 41/044* (2013.01); *H04L 12/403* (2013.01); *H04L 41/022* (2013.01); *H04L 41/0226* (2013.01); *H04L 41/0803* (2013.01); *H04L 41/0853* (2013.01); *H04L 41/0893* (2013.01); *H04L 41/12* (2013.01); *H04L 41/046* (2013.01)

(58) Field of Classification Search
CPC . H04L 12/403; H04L 41/022; H04L 41/0226; H04L 41/044; H04L 41/046; H04L 41/0803; H04L 41/0853; H04L 41/0893; H04L 41/12

USPC ................................... 709/203, 223
See application file for complete search history.

(56) References Cited

U.S. PATENT DOCUMENTS

| 10,057,131 B1* | 8/2018 | Brown ................ H04L 41/0853 |
| 10,176,213 B2* | 1/2019 | Cheng ................ G06F 11/1446 |
| 2008/0158177 A1* | 7/2008 | Wilson ................ G06F 3/0416 345/173 |

(Continued)

FOREIGN PATENT DOCUMENTS

| EP | 2530860 | 12/2012 |
| EP | 2672662 | 12/2013 |

(Continued)

OTHER PUBLICATIONS

"Search Report of Europe Counterpart Application", dated Dec. 11, 2018, p. 1-p. 7.

*Primary Examiner* — Frantz B Jean
(74) *Attorney, Agent, or Firm* — JCIPRNET

(57) ABSTRACT

A mechanism which can easily acquire a connection relationship of each device even in a multilayered network system having a plurality of protocols is provided. A network system has at least one network including a master processing unit and one or a plurality of slave processing units. Each of first, second, and third devices holds characteristic information indicating whether or not the device has a master processing unit or a slave processing unit. The first device includes a network management unit that acquires single-layer network configuration information from each master processing unit included in the network system to generate multilayer network configuration information indicating a connection relationship of each device in the network system.

20 Claims, 24 Drawing Sheets

(56) References Cited

U.S. PATENT DOCUMENTS

2015/0362903 A1\* 12/2015 Ono .................. G05B 19/0428
                                                              700/3
2018/0062982 A1\* 3/2018 Ishida .................... H04L 41/12
2019/0166038 A1\* 5/2019 Yamada ................. H04L 45/04

FOREIGN PATENT DOCUMENTS

| EP | 2937751 | | 10/2015 | |
|---|---|---|---|---|
| EP | 2937751 | A1 \* | 10/2015 | ......... G05B 19/0428 |
| JP | H05181513 | | 7/1993 | |
| WO | 2014143104 | | 9/2014 | |
| WO | 2014181432 | | 11/2014 | |
| WO | 2014209368 | | 12/2014 | |

\* cited by examiner

1021

| DEVICE | NRM | NET5 | NET4 | NET3 | NET2 | NET1 | NET0 | MST |
|---|---|---|---|---|---|---|---|---|
| #00 | ON | OFF | OFF | ON | OFF | ON | OFF (default) | ON |
| #01 | OFF | OFF | OFF | OFF | OFF | OFF | OFF (default) | OFF |
| #02 | OFF | OFF | OFF | OFF | OFF | OFF | OFF (default) | OFF |
| #03 | OFF | OFF | OFF | OFF | OFF | OFF | OFF (default) | OFF |
| #04 | OFF | OFF | OFF | OFF | OFF | OFF | OFF (default) | OFF |
| #05 | OFF | OFF | OFF | ON | OFF | OFF | OFF (default) | OFF |
| #06 | OFF | OFF | OFF | | | | OFF (default) | ON |

FIG. 11

NETWORK SYSTEM, CONTROL METHOD, AND CONTROL DEVICE

CROSS-REFERENCE TO RELATED APPLICATION

This application claims the priority of Japan patent application serial no. 2018-012369, filed on Jan. 29, 2018. The entirety of the above-mentioned patent application is hereby incorporated by reference herein and made a part of this specification.

BACKGROUND

Technical Field

The disclosure relates to a network system in which a plurality of devices for factory automation (FA) are connected.

Description of Related Art

Along with the advancement of information and communication technology (ICT) in recent years, large-scale network systems including a plurality of control devices have also been realized in the technical field of FA.

In a network system having a plurality of layers, it is necessary to perform routing for transmission of data to a target device. For example, Japanese Laid-open No. H05-181513 discloses a configuration for automatically specifying a transmission route of state data in a link system of PCs connected in a multilayer structure to facilitate specification of the route.

Increase in the scale of the network system can also increase the trouble of acquiring the connection relationships and topologies of devices. To address such a problem, PCT International Publication No. WO2014/143104 discloses a control system which can smoothly acquire connection information of each of a plurality of programmable controllers connected through a communication network.

Further, in the network system for FA, different protocols may be used for different layers. PCT International Publication No. WO2014/181432 provides a solution to the problem that error analysis of each control device using line data cannot be performed when protocols for control devices are different.

In the network system for FA, it is presumed that more devices are connected such that the network system is more multilayered. In such a multilayered network system, there is also a demand for a mechanism that can easily acquire the connection relationships, topologies or the like of devices. The related art presume no means for dealing with different protocols. Also, in the related art, profile data in which information regarding protocols of control devices is profiled should be provided on a programmable display device and thus there is a problem of low flexibility.

The disclosure provides a mechanism that can easily acquire connection relationships of devices in a network system even in a multilayered network system having a plurality of protocols.

SUMMARY

An embodiment of the disclosure provides a network system having at least one network including a master processing unit and one or a plurality of slave processing units. The network system includes a first device having the master processing unit, a second device having the master processing unit and the slave processing unit, and a third device having the slave processing unit. Each of the first, second, and third devices is configured to hold characteristic information indicating whether or not the device has the master processing unit or the slave processing unit. Each master processing unit includes a device search unit configured to acquire the characteristic information from each of one or a plurality of slave processing units connected to a network managed by the master processing unit and to generate single-layer network configuration information indicating information of a device connected to each network. The first device includes a network management unit configured to acquire single-layer network configuration information from each master processing unit included in the network system to generate multilayer network configuration information indicating a connection relationship of each device in the network system.

An embodiment of the disclosure provides a control method for a network system having at least one network including a master processing unit and one or a plurality of slave processing units. The network system includes a first device having the master processing unit, a second device having the master processing unit and the slave processing unit, and a third device having the slave processing unit. Each of the first, second, and third devices is configured to hold characteristic information indicating whether or not the device has the master processing unit or the slave processing unit. The control method includes each master processing unit acquiring the characteristic information from each of one or a plurality of slave processing units connected to a network managed by the master processing unit and generating single-layer network configuration information indicating information of a device connected to each network, and the first device acquiring single-layer network configuration information from each master processing unit included in the network system to generate multilayer network configuration information indicating a connection relationship of each device in the network system.

An embodiment of the disclosure provides a control device used in a network system having at least one network including a master processing unit and one or a plurality of slave processing units. The control device has the master processing unit. The network system includes a first device having the master processing unit and the slave processing unit, and a second device having the slave processing unit. Each of the control device, the first device, and the second device is configured to hold characteristic information indicating whether or not the device has the master processing unit or the slave processing unit. Each master processing unit includes a device search unit configured to acquire the characteristic information from each of one or a plurality of slave processing units connected to a network managed by the master processing unit and to generate single-layer network configuration information indicating information of a device connected to each network. The control device includes a network management unit configured to acquire single-layer network configuration information from each master processing unit included in the network system to generate multilayer network configuration information indicating a connection relationship of each device in the network system.

BRIEF DESCRIPTION OF THE DRAWINGS

FIG. 11 is a schematic diagram showing an example of configuration information generated by a master processing unit of the network system according to the present embodiment.

DESCRIPTION OF THE EMBODIMENTS

Figure 1:
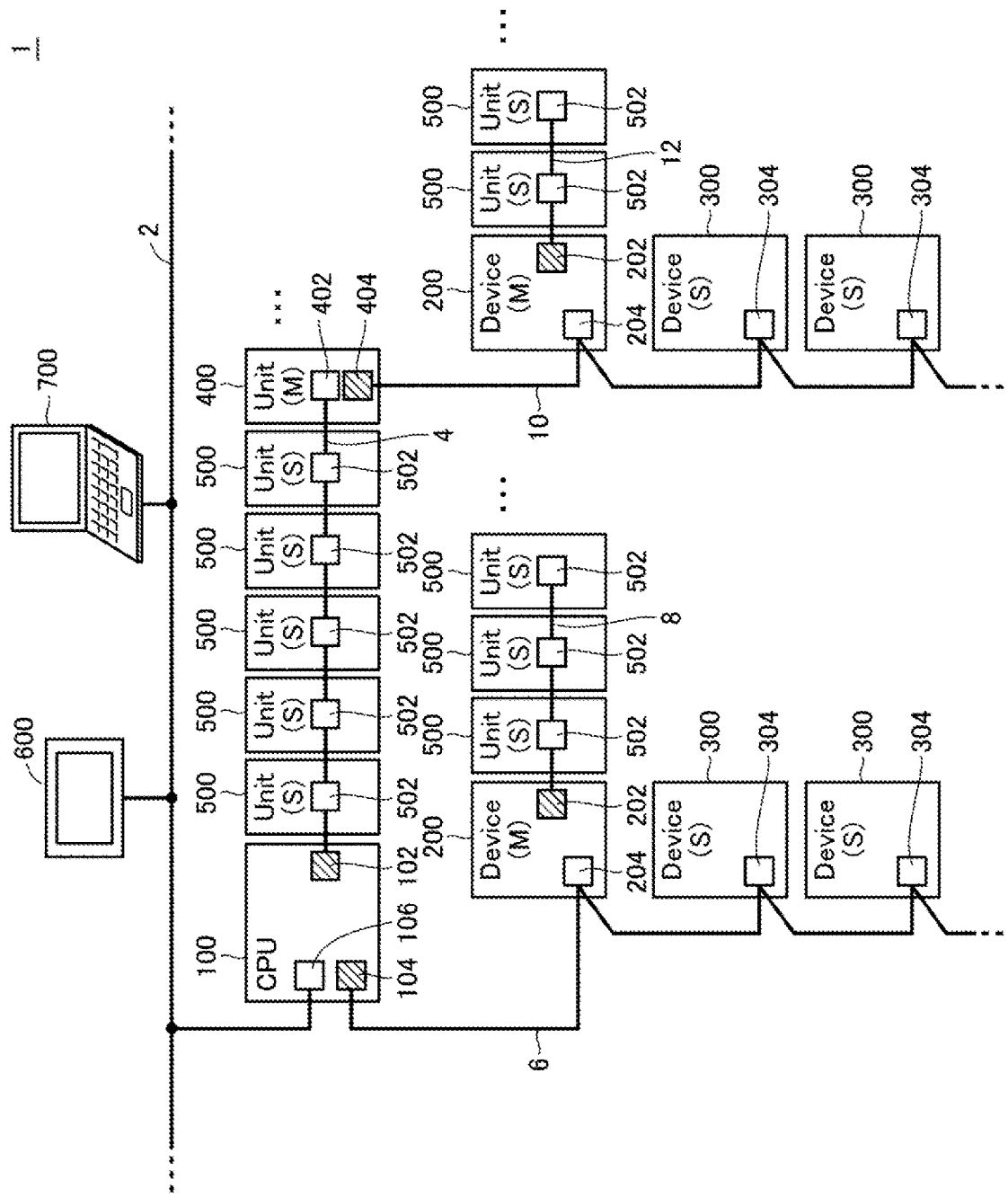
FIG. 1 is a schematic diagram showing an example of the overall configuration of a network system according to the present embodiment.

Embodiments of the disclosure will be described in detail with reference to the drawings. In the drawings, the same or corresponding parts are denoted by the same reference numerals, and the description thereof will not be repeated.

An embodiment of the disclosure provides a network system having at least one network including a master processing unit and one or a plurality of slave processing units. The network system includes a first device having the master processing unit, a second device having the master processing unit and the slave processing unit, and a third device having the slave processing unit. Each of the first, second, and third devices is configured to hold characteristic information indicating whether or not the device has the master processing unit or the slave processing unit. Each master processing unit includes a device search unit configured to acquire the characteristic information from each of one or a plurality of slave processing units connected to a network managed by the master processing unit and to generate single-layer network configuration information indicating information of a device connected to each network. The first device includes a network management unit configured to acquire single-layer network configuration information from each master processing unit included in the network system to generate multilayer network configuration information indicating a connection relationship of each device in the network system.

According to this disclosure, characteristic information held by each device is acquired by a master processing unit of each network and further multilayer network configuration information is generated by acquiring the acquired characteristic information. Since such a process of generating multilayer network configuration information is completed within the first device, it is possible to speed up the process of generating multilayer network configuration information itself and an access process using the multilayer network configuration information.

In the above disclosure, the network management unit may be configured to specify a second device connected to a first network managed by the first device by referring to single-layer network configuration information generated by the master processing unit of the first device and to acquire single-layer network configuration information of a second network managed by the specified second device by referring to single-layer network configuration information generated by a master processing unit of the specified second device.

According to this disclosure, even when a plurality of networks are hierarchically arranged in the network system, networks can be sequentially searched for the master processing unit.

In the above disclosure, the network management unit may be configured to specify a second device connected to the second network by referring to the single-layer network configuration information of the second network and to acquire single-layer network configuration information of a third network managed by the specified second device by referring to single-layer network configuration information generated by a master processing unit of the specified second device.

According to this disclosure, even when networks of the network system are multilayered, networks of layers can be sequentially searched.

In the above disclosure, the network management unit may be configured to generate the multilayer network configuration information by associating single-layer network configuration information acquired from each master processing unit included in the network system on the basis of a position of a second device present on each network.

According to this disclosure, it is possible to generate multilayer network configuration information reflecting the configuration of a new network branching from the master processing unit in the network system.

In the above disclosure, the characteristic information may include information indicating a type of a protocol supported by each device, information indicating presence or absence of a master processing unit, and information indicating presence or absence of a network management unit according to a predetermined format.

According to this disclosure, the characteristic information held by each device is generated according to a common format, and therefore it is possible to simplify and speed up the process of generating single-layer network configuration information by each master processing unit and the process of generating multilayer network configuration information using one or a plurality of single-layer network configuration information.

In the above disclosure, the network management unit may be configured to transmit a command to acquire single-layer network configuration information by encapsulating the command in accordance with a protocol of a network present on a route to a target master processing unit from which single-layer network configuration information is to be acquired.

According to this disclosure, even when a plurality of protocols are present in the network system, the command can be transmitted to an arbitrary device without being affected by the difference between protocols.

In the above disclosure, the network management unit may be configured to search for devices included in the network system within a range defined by a preset search range setting.

According to this disclosure, it is possible to avoid contention between network management units, and it is also possible to realize high-speed processing by restricting search ranges to specific ranges in the network system.

In the above disclosure, the network system may include a plurality of first devices, and the network management unit may be configured to, when identifying a network management unit included in another first device, request multilayer network configuration information generated by the identified network management unit from the identified network management unit.

According to this disclosure, it is possible to efficiently generate multilayer network configuration information while avoiding contention between network management units.

In the above disclosure, the network management unit may be configured to respond with generated multilayer network configuration information in response to a request from an external device.

According to this disclosure, the multilayer network configuration information can be used not only in the first device but also in the external device.

An embodiment of the disclosure provides a control method for a network system having at least one network including a master processing unit and one or a plurality of slave processing units. The network system includes a first device having the master processing unit, a second device having the master processing unit and the slave processing unit, and a third device having the slave processing unit. Each of the first, second, and third devices is configured to hold characteristic information indicating whether or not the device has the master processing unit or the slave processing unit. The control method includes each master processing unit acquiring the characteristic information from each of one or a plurality of slave processing units connected to a network managed by the master processing unit and generating single-layer network configuration information indicating information of a device connected to each network, and the first device acquiring single-layer network configuration information from each master processing unit included in the network system to generate multilayer network configuration information indicating a connection relationship of each device in the network system.

An embodiment of the disclosure provides a control device used in a network system having at least one network including a master processing unit and one or a plurality of slave processing units. The control device has the master processing unit. The network system includes a first device having the master processing unit and the slave processing unit, and a second device having the slave processing unit. Each of the control device, the first device, and the second device is configured to hold characteristic information indicating whether or not the device has the master processing unit or the slave processing unit. Each master processing unit includes a device search unit configured to acquire the characteristic information from each of one or a plurality of slave processing units connected to a network managed by the master processing unit and to generate single-layer network configuration information indicating information of a device connected to each network. The control device includes a network management unit configured to acquire single-layer network configuration information from each master processing unit included in the network system to generate multilayer network configuration information indicating a connection relationship of each device in the network system.

According to an embodiment of the disclosure, it is possible to provide a mechanism which can easily acquire the connection relationships of devices even in a multilayered network system having a plurality of protocols.

<A. Exemplary Applications>

First, an example of a situation in which the disclosure is applied will be described with reference to FIGS. 1 to 3.

FIG. 1 is a schematic diagram showing an example of the overall configuration of a network system 1 according to the present embodiment. Referring to FIG. 1, the network system 1 includes a control device that controls an arbitrary control target such as a facility and a production apparatus. The network system 1 includes a controller 100, one or a plurality of master devices 200 and 400, and one or a plurality of slave devices 300 and 500.

The controller 100 is a control device that can execute arbitrary application programs. The controller 100 can perform one or a plurality of network master processes. In the present specification, the term "network master process" encompasses processes for managing data transmission, connection states, or the like in a target network (basically, of a single layer). A portion implemented by hardware and/or software for realizing network master processes is also referred to as a "master processing unit." The controller 100 corresponds to a device having a master processing unit. Basically, each master processing unit includes network ports and manages data transmission or the like of devices present on a network connected to each network port.

Each of the slave devices 300 and 500 can perform at least one network slave process. In this specification, the term "network slave process" indicates a process paired with the "network master process," and encompasses processes for data transmission or the like performed under the control of a master processing unit on a connected network. A portion implemented by hardware and/or software for realizing network slave processes is also referred to as a "slave processing unit." Each of the slave devices 300 and 500 corresponds to a device having a slave processing unit. Basically, each slave processing unit includes a network port.

The slave devices 300 and 500 have substantially the same functions, but have different structures. The slave device 300 is of an independent type and can be connected to a network independently from other slave devices 300. The slave device 500 is of a unit type and can be connected to other slave devices 500. The slave devices 300 and 500 having these different structures are appropriately selected depending on requirements or situations.

Each of the master devices 200 and 400 has a master processing unit in addition to a slave processing unit. That is, each of the master devices 200 and 400 corresponds to a device having a master processing unit and a slave processing unit. Normally, each of the master devices 200 and 400 includes one or a plurality of slave processing units and one or a plurality of master processing units. The master devices 200 and 400 have substantially the same functions, but have different structures. The master device 200 is of an independent type and can be connected to a network independently from other master devices 200. The master device 400 is of a unit type and can be connected to other master devices 400. The master devices 200 and 400 having these different structures are appropriately selected depending on requirements or situations. It is to be noted that the unit-type master device 400 and/or the unit-type slave device 500 can be connected to the master device 200.

The network system 1 includes at least one network including a master processing unit and one or a plurality of slave processing units as described above.

In the network system 1, the controller 100 is connected to a plurality of slave devices 500 and a master device 400 via a local bus 4 extending from a port included in a master processing unit 102. Each of the slave devices 500 has a slave processing unit 502 and the master device 400 has a slave processing unit 402.

The controller 100 is further connected to a master device 200 and a plurality of slave devices 300 via a field network 6 extending from a port included in a master processing unit 104. The master device 200 has a slave processing unit 204 and each of the slave devices 300 has a slave processing unit 304.

As an example, the controller 100, the master device 400 and the slave devices 500 are connected in a daisy chain via the local bus 4. To realize the daisy chain connection, data is serially transmitted via the local bus 4. That is, a protocol suitable for serial transmission is used for the local bus 4.

On the other hand, an industrial network protocol for guaranteeing a data arrival time is used for the field network 6 that connects the controller 100 and the master and slave devices 200 and 300. For example, EtherCAT (registered trademark) may be adopted as such an industrial network protocol. Of course, it is not limited to EtherCAT, and EtherNet/IP (registered trademark), DeviceNet (registered trademark), CompoNet (registered trademark), PROFIBUS (registered trademark), PROFINET (registered trademark), or the like may also be adopted.

The master device 200 connected to the field network 6 is connected to a plurality of slave devices 500 via a local bus 8 extending from a port included in a master processing unit 202. Each of the slave devices 500 has a slave processing unit 502.

The master device 400 connected to the local bus 4 is connected to a master device 200 and a plurality of slave devices 300 via a field network 10 extending from a port included in a master processing unit 404. The master device 200 has a slave processing unit 204 and each of the slave devices 300 has a slave processing unit 304.

The master device 200 connected to the field network 10 is connected to a plurality of slave devices 500 via a local bus 12 extending from a port included in a master processing unit 202. Each of the slave devices 500 has a slave processing unit 502.

In this specification, the term "network" encompasses arbitrary data transmission routes in addition to the local buses 4, 8, and 12 and the field networks 6, and 10. That is, the term "network" encompasses all routes reachable from any device included in the network system, regardless of the transmission medium, transmission form, protocol, or the like.

In the network system 1 shown in FIG. 1, the controller 100 has an upper network controller 106 and is connected to an upper network 2 via the upper network controller 106.

A human machine interface (HMI) device 600 and a support device 700 are connected to the upper network 2.

The HMI device 600 receives user operations and presents information managed by the network system 1 to the user. Typically, the HMI device 600 can give an arbitrary command to the controller 100 and can acquire and display state data or the like managed by the controller 100. Further, the HMI device 600 can access any device included in the network system 1 and monitor a device status of the accessed device (details of which will be described later).

The support device 700 provides a function for creating an application program that is executed by the controller 100. Further, the support device 700 can access any device included in the network system 1 and can transfer a device setting to the accessed device and monitor a device status of the accessed device (details of which will be described later).

From the viewpoint of the controller 100, there are a total of three layers of networks: a layer of three networks which are the upper network 2, the local bus 4, and the field network 6 (first layer), a layer of two networks which are the local bus 8 and the field network 10 (second layer), and the local bus 12 (third layer) as described above.

A method of acquiring configuration information of such a multilayered network system will be described below. In the following description, configuration information of a network of a specific layer (that is, a single network) is also referred to as a "single-layer network configuration information" or simply "configuration information." On the other hand, overall configuration information of the multilayered network system is referred to as "multilayer network configuration information." That is, when a target network system has a plurality of network layers, the multilayer network configuration information substantially includes a plurality of single-layer network configuration information.

For the sake of simplicity of explanation, it is assumed in the following description that "configuration information" means single-layer network configuration information when it is stated without any particular qualifications.

Figure 2:
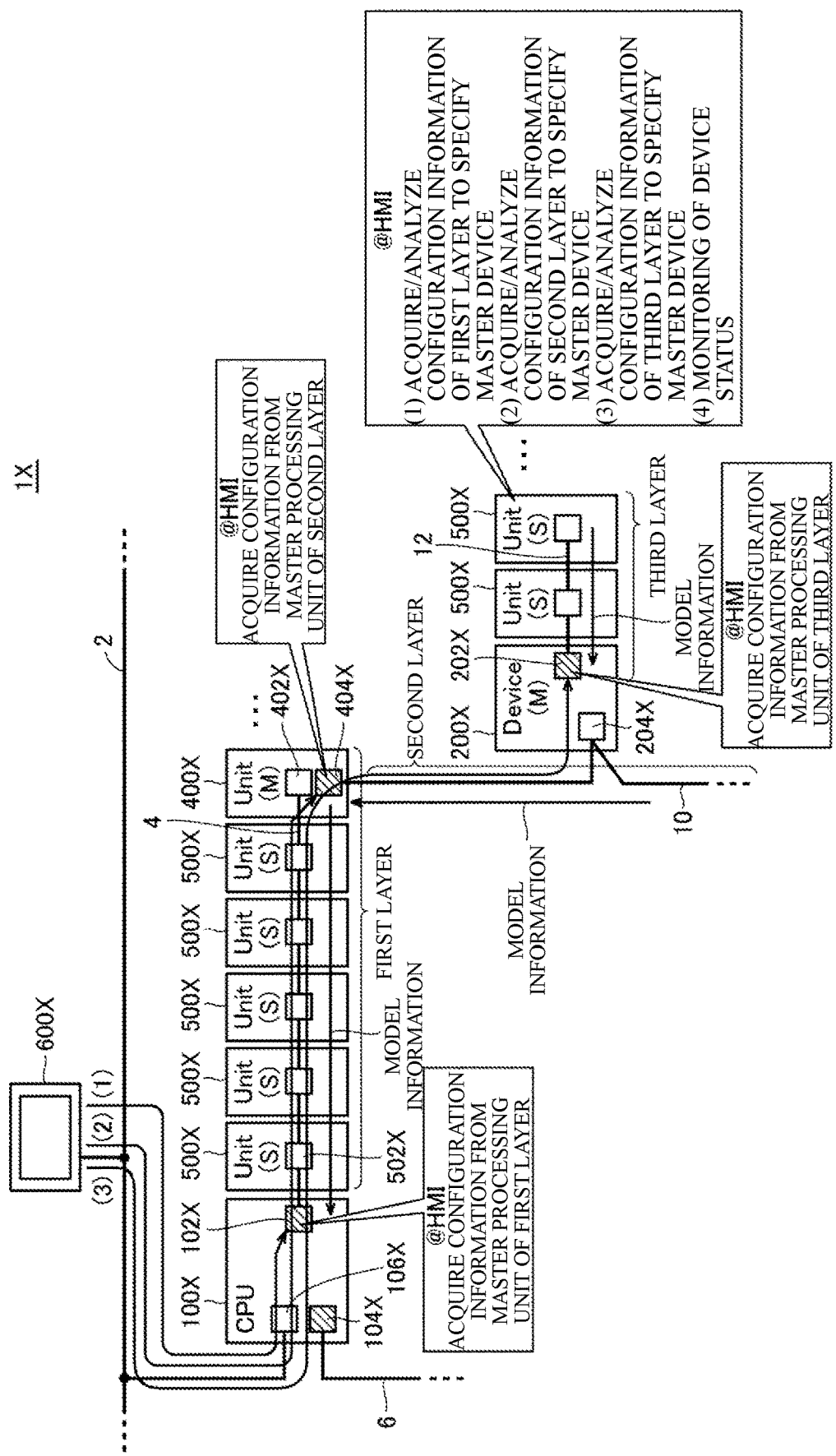
FIG. 2 is a schematic diagram illustrating an access process in a network configuration of a network system according to the related art of the disclosure.

FIG. 2 is a schematic diagram illustrating an access process in a network configuration of a network system 1X according to the related art of the disclosure. The network system 1X shown in FIG. 2 includes a controller 100X, a plurality of slave devices 500X, and master devices 200X and 400X. The network system 1X shown in FIG. 2 has a topology similar to that of the network system 1 shown in FIG. 1.

When master processing units 102X and 104X in the controller 100X, a master processing unit 404X in the master device 400, and a master processing unit 202X in the master device 200X in the network system 1X shown in FIG. 2 are compared with the master processing units 102, 104, 202, and 404 according to the present embodiment, they are different in terms of the content of configuration information for each network and the method of generating the configuration information.

In the related art of the disclosure, each of the master processing units 102X, 104X, 202X, and 404X acquires model information from each device connected to a target network and generates configuration information of each network. The model information includes information indicating the type of each device (such as the product type).

Each master processing unit refers to the configuration information to control access to a device connected to a network managed by the master processing unit.

For example, a process in which an HMI device 600X connected to the controller 100X via an upper network 2 accesses any device will be considered. In this case, the HMI device 600X acquires configuration information held by the master processing unit 102X of the controller 100X and analyzes the acquired configuration information to identify each device. Then, on the basis of the identification result, the HMI device 600X accesses the target device and monitors the state of the accessed device.

Alternatively, a process in which an arbitrary application of the controller 100X accesses any device will be considered. In this case, similarly, the application of the controller 100X transmits an arbitrary instruction to a target device or acquires arbitrary information from the target device on the basis of the configuration information held by the master processing unit 102X.

In such a method using configuration information including model information of each device, it is difficult to deal with a multilayered network system. FIG. 2 shows a processing procedure in the case of accessing a slave device 500X located at the end of a three-layer network system as an example.

First, the HMI device 600X acquires and analyzes configuration information held by the master processing unit 102X of the controller 100X (configuration information of a first layer) to specify each device on a local bus 4 managed by the master processing unit 102X (see (1) in FIG. 2). In this analysis, the HMI device 600X determines the presence or absence of a device having a master processing unit on the basis of the model information of each device.

In the example shown in FIG. 2, a master device 400X on the local bus 4 is identified as having a master processing unit and the HMI device 600X acquires and analyzes configuration information held by the master processing unit 404X of the master device 400X (configuration information of a second layer) to specify each device on a field network 10 managed by the master processing unit 404X (see (2) in FIG. 2).

In the example shown in FIG. 2, a master device 200X on the field network 10 is identified as having a master processing unit and the HMI device 600X acquires and analyzes configuration information held by the master processing unit 202X of the master device 200X (configuration information of a third layer) to specify each device on a local bus 12 managed by the master processing unit 202X (see (3) in FIG. 2).

Finally, the HMI device 600X identifies the slave device 500X on the local bus 12, accesses the identified slave device 500X, and monitors the device status thereof.

The method of acquiring and analyzing configuration information by the HMI device 600X as described above has the following problems.

First, since the presence of a master processing unit is determined on the basis of the model information of each device, it is needed to update analysis logic in the HMI device 600X each time a new type of unit is developed.

In addition, it is needed to analyze configuration information each time access is made to a network of another layer, and the more multilayered the network system is, the longer it takes to acquire and analyze configuration information, thus lowering the responsiveness.

Next, a process in which an arbitrary application of the controller 100X accesses any device present on a network of another layer will be considered. The master processing unit 102X of the controller 100X can specify each device present on the local bus 4 managed by the controller 100X, but cannot determine whether or not a master processing unit is present in any device only with the model information. In addition, when the application itself determines whether or not a master processing unit is present in each device on the basis of model information, it is needed to update the analysis logic each time a new type of unit is developed, similarly to the case of the HMI device 600X described above.

In the controller 100X, it is possible to hard-code a table indicating whether or not the device has a master processing unit for each model. However, in this case, it is difficult to update the table to deal with a new device.

To address problems such as those described above, in the present embodiment, characteristic information including information as to whether or not a master processing unit is present is arranged in each device, and each master processing unit acquires characteristic information from each device present on a network managed by the master processing unit and generates configuration information. By referring to the generated configuration information, it is possible to easily identify from any device a topology thereof such as whether or not a network of another layer is connected to the device.

Figure 3:
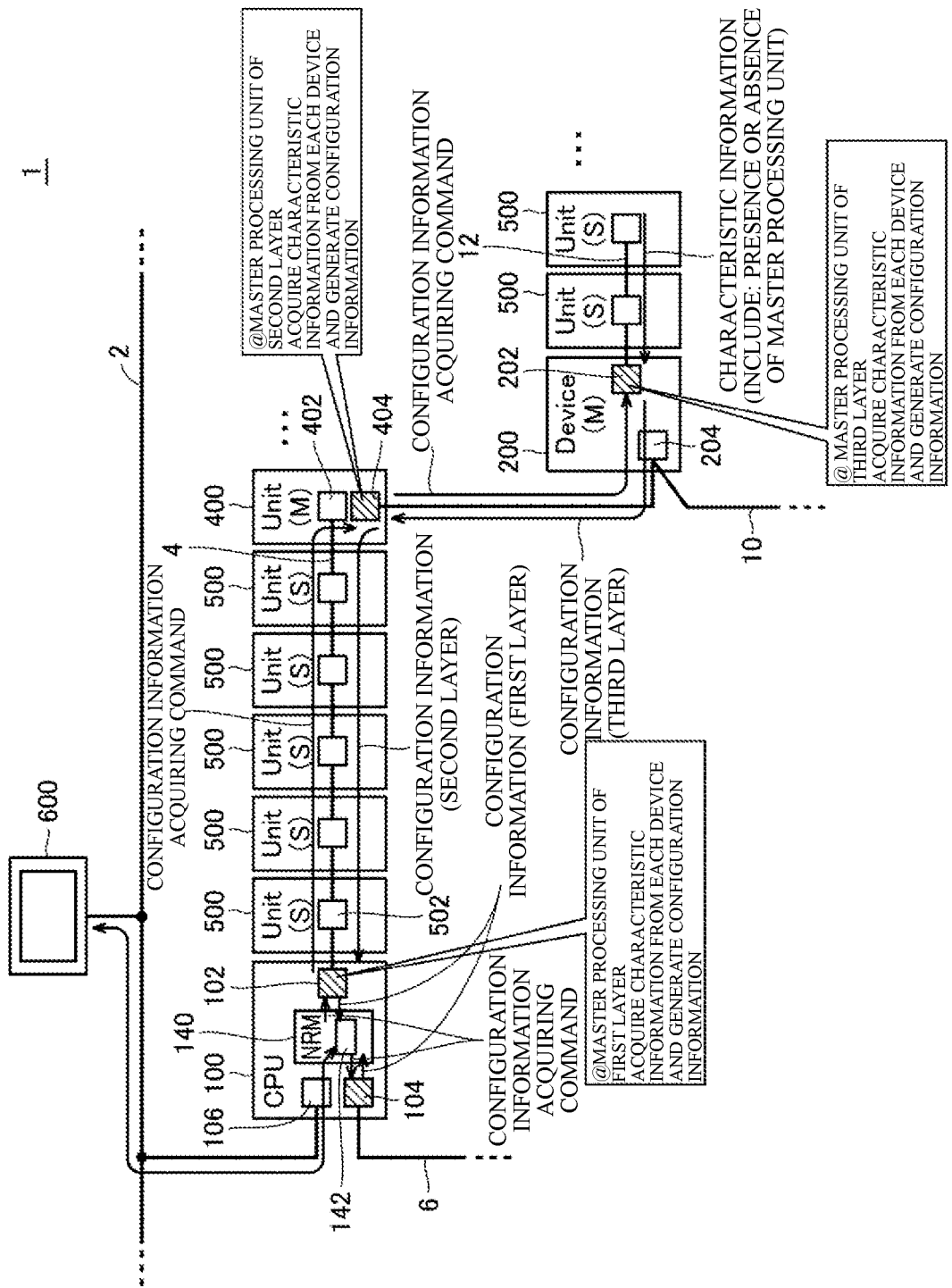
FIG. 3 is a schematic diagram illustrating a process of generating multilayer network configuration information in the network system according to the present embodiment.

FIG. 3 is a schematic diagram illustrating a process of generating multilayer network configuration information in the network system 1 according to the present embodiment. Referring to FIG. 3, in the network system 1 according to the present embodiment, the controller 100 has a network resource manager 140 (hereinafter also referred to as an "NRM"). The network resource manager 140 acquires configuration information from a master processing unit included in the network system 1 and generates multilayer network configuration information 142. The multilayer network configuration information 142 includes information indicating the connection relationship of each device including the topology of the target network system 1.

In the present embodiment, each of the master processing units 102, 104, 202, and 404 acquires characteristic information from each device connected to a target network and generates configuration information of each network. The characteristic information includes at least information indicating whether or not the device has a master processing unit or a slave processing unit. That is, each of the controller 100, the master devices 200 and 400, and the slave devices 300 and 500 holds characteristic information. By acquiring such characteristic information and generating the configuration information, the controller 100 or the master devices 200 and 400 can uniquely specify a master device on a network managed by the controller 100 or the master devices 200 and 400. Details of the characteristic information will be described later.

The network resource manager 140 transmits a configuration information acquiring command to each master device (master processing unit) in the network system 1. The network resource manager 140 hierarchically searches for a master processing unit on the basis of the configuration information from the master processing unit. In this manner, transmission of the configuration information acquiring command is repeated until there is no other master processing unit on a network managed by each master processing unit.

The configuration information generated by each master processing unit present in the network system 1 is transmitted to the network resource manager 140 through such a series of processing including transmission of the configuration information acquiring command. The network resource manager 140 aggregates the acquired configuration information from each master processing unit to generate multilayer network configuration information 142.

The HMI device 600 accesses the multilayer network configuration information 142 generated and held by the network resource manager 140, displays the content thereof, and accesses a target device on the basis of the multilayer network configuration information 142. Although not shown, the support device 700 may also have the same functionality as the HMI device 600.

The network resource manager 140 may also be arranged in a device other than the controller 100.

According to the network system 1 according to the present embodiment, the network resource manager 140 acquires configuration information from all master processing units included in the network system 1 to generate multilayer network configuration information 142. Each master processing unit generates configuration information when identifying network configuration such as when an initialization process is performed. Therefore, since each piece of configuration information has already been generated when the multilayer network configuration information 142 is generated, it is not necessary to iteratively acquire information of the network configuration unlike the related art described above. As a result, the time required to generate the multilayer network configuration information 142 can be shortened.

In addition, according to the network system 1 of the present embodiment, necessary information can be collected by acquiring characteristic information held by each device, and therefore it is not needed to perform, for example, update of the analysis logic in the controller 100 or the HMI device 600. Therefore, even when a new type of unit is developed, there are no problems such as those of versatility or compatibility, provided that characteristic information of the new type unit and characteristic information of existing units share a common format.

<B. Exemplary Hardware Configurations of Devices Included in Network System 1>

Next, exemplary hardware configurations of devices included in the network system 1 according to the present embodiment will be described.

(b1: Controller 100)

Figure 4:
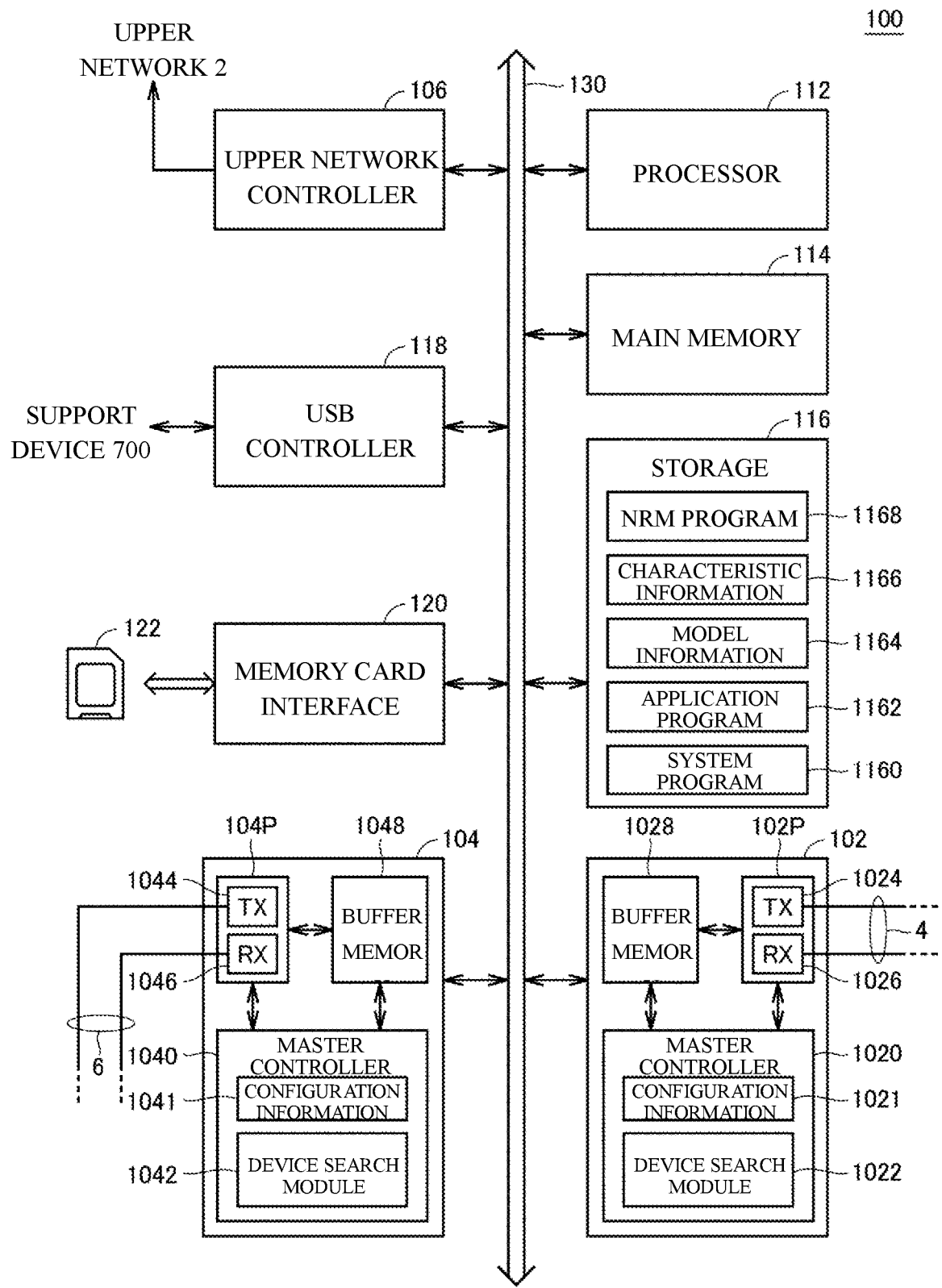
FIG. 4 is a schematic diagram showing an exemplary hardware configuration of a controller included in the network system according to the present embodiment.

FIG. 4 is a schematic diagram showing an exemplary hardware configuration of the controller 100 included in the network system 1 according to the present embodiment. Referring to FIG. 4, the controller 100 includes a processor 112, a main memory 114, a storage 116, a Universal Serial Bus (USB) controller 118, and a memory card interface 120 in addition to the master processing unit 102 of the local bus 4, the master processing unit 104 of the field network 6, and the upper network controller 106. These components are connected via a processor bus 130.

The processor 112 corresponds to an arithmetic processing unit that performs control calculation or the like and is made of a central processing unit (CPU), a graphics processing unit (GPU), or the like. Specifically, the processor 112 reads a program (for example, a system program 1160 and an application program 1162) stored in the storage 116, loads the program into the main memory 114, and executes the program to realize control according to a control target and various processing as will be described later.

The main memory 114 is made of a volatile storage device such as a dynamic random access memory (DRAM) or a static random access memory (SRAM) or the like. The storage 116 is made of a nonvolatile storage device such as a hard disk drive (HDD) or a solid state drive (SSD).

The storage 116 stores the application program 1162 created in accordance with a control target such as a facility or a machine in addition to the system program 1160 for realizing basic functions. The storage 116 further stores model information 1164 indicating the device type or the like of the controller 100 and characteristic information 1166 indicating a network communication function or the like that the controller 100 has.

The storage 116 also stores a network resource manager (NRM) program 1168. The NRM program 1168 is a program for realizing the network resource manager 140. Processing for realizing the network resource manager 140 is provided by the processor 112 executing the NRM program 1168.

The upper network controller 106 exchanges data with an arbitrary information processing device such as the HMI device 600 and the support device 700 (see FIG. 1) via the upper network 2.

The USB controller 118 exchanges data with the support device 700 or the like through a USB connection.

The memory card interface 120 receives a memory card 122 which is an example of a removable recording medium. The memory card interface 120 can write data to the memory card 122 and read various data (such as setting data or trace data) from the memory card 122.

The master processing unit 102 of the local bus 4 performs a network master process relating to data transmission on the local bus 4. More specifically, the master processing unit 102 includes a master controller 1020, a local bus communication port 102P including a transmitting circuit (TX) 1024 and a receiving circuit (RX) 1026, and a buffer memory 1028.

The local bus 4 is electrically connected to the local bus communication port 102P. The transmitting circuit 1024 generates a communication frame including data that is to be transmitted from the controller 100 via the local bus 4 and sends out the communication frame to the local bus 4. The receiving circuit 1026 receives a communication frame transmitted on the local bus 4 and reconstructs data included in the communication frame.

The buffer memory 1028 temporarily holds data transmitted via the local bus 4.

The master controller 1020 is a processing unit for providing network master processes. More specifically, the master controller 1020 has a device search module 1022. The device search module 1022 acquires state data of each device connected to the local bus 4 and generates configuration information 1021. The master controller 1020 controls the timing and order of data transmission on the local bus 4 on the basis of the configuration information 1021.

Further, the master processing unit 104 of the field network 6 performs a network master process relating to data transmission on the field network 6. More specifically, the master processing unit 104 includes a master controller 1040, a network port 104P including a transmitting circuit (TX) 1044 and a receiving circuit (RX) 1046, and a buffer memory 1048.

The field network 6 is electrically connected to the network port 104P. The transmitting circuit 1044 generates a communication frame including data that is to be transmitted from the controller 100 via the field network 6 and sends out the communication frame to the field network 6. The receiving circuit 1046 receives a communication frame transmitted on the field network 6 and reconstructs data included in the communication frame.

The buffer memory 1048 temporarily holds data transmitted via the field network 6.

The master controller 1040 is a processing unit for providing network master processes. More specifically, the master controller 1040 has a device search module 1042. The device search module 1042 acquires state data of each device connected to the field network 6 and generates configuration information 1041. The master controller 1040 controls the timing and order of data transmission on the field network 6 on the basis of the generated configuration information 1041.

Although FIG. 4 shows an exemplary configuration in which necessary functions are provided by the processor 112 executing the program, some or all of the provided functions may be implemented by a dedicated hardware circuit (for example, an application specific integrated circuit (ASIC) or a field-programmable gate array (FPGA)). Alternatively, a main part of the controller 100 may be realized using hardware complying with a versatile (general-purpose) architecture (for example, an industrial personal computer based on a general-purpose personal computer). In this case, using a virtualization technique, a plurality of operating systems (OSs) for different uses may be executed in parallel while necessary applications are executed on each OS. It is also possible to employ a configuration in which the functions of the HMI device 600, the support device 700, or the like are integrated into the controller 100.

(b2: Master Device 200)

Figure 5:
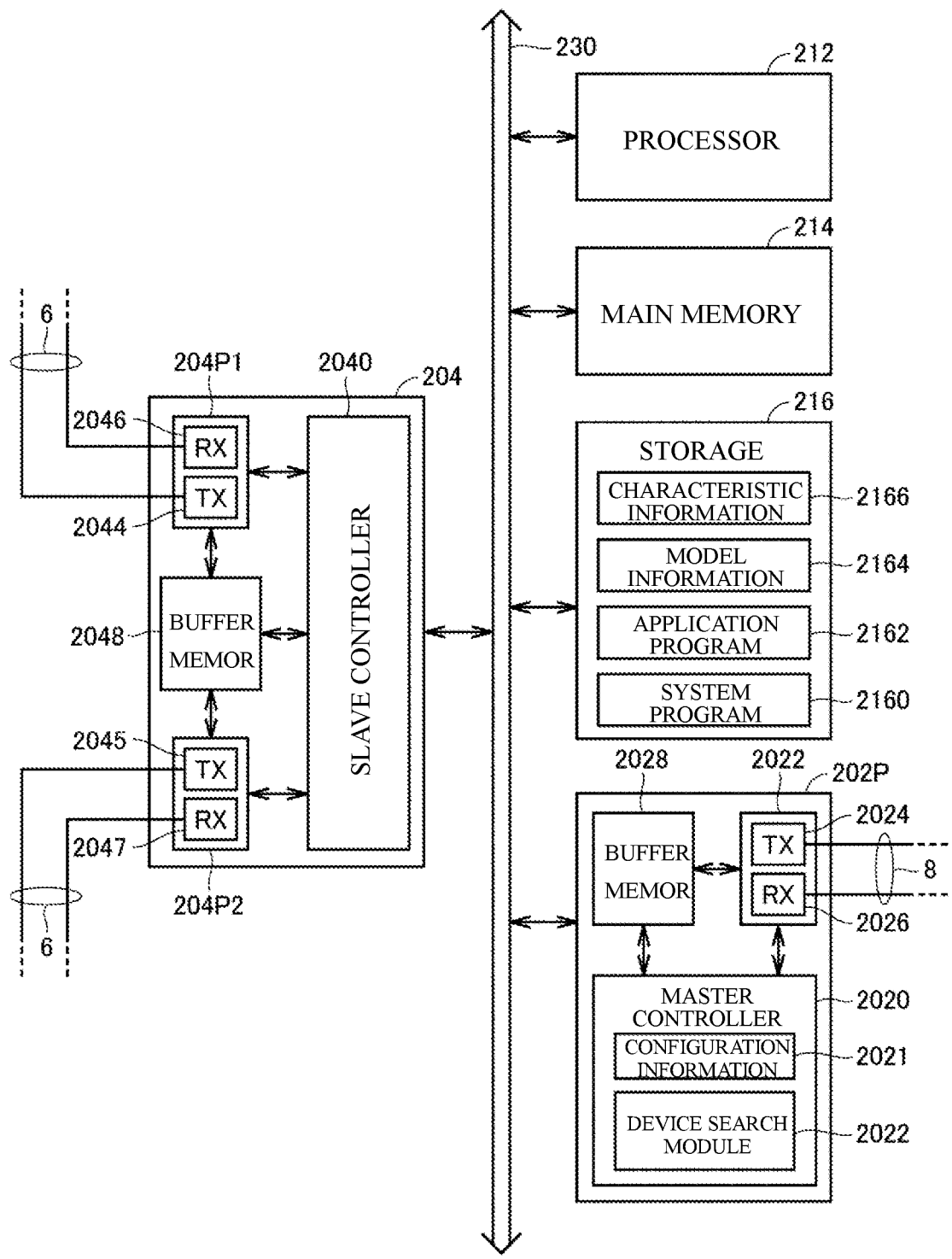
FIG. 5 is a schematic diagram showing an exemplary hardware configuration of a master device included in the network system according to the present embodiment.

FIG. 5 is a schematic diagram showing an exemplary hardware configuration of the master device 200 included in the network system 1 according to the present embodiment. Referring to FIG. 5, the master device 200 includes a processor 212, a main memory 214, and a storage 216 in addition to the master processing unit 202 of the local bus 8 and the slave processing unit 204 of the field network 6. These components are connected via a processor bus 230.

The processor 212 corresponds to an arithmetic processing unit that performs control calculation or the like and is made of a CPU, a GPU, or the like. Specifically, the processor 212 reads a program (for example, a system program 2160 and the application program 2162) stored in the storage 216, loads the program into the main memory 214, and executes the program to realize predetermined control processing.

The main memory 214 is made of a volatile storage device such as a DRAM or an SRAM or the like. The storage 216 is made of, for example, a nonvolatile storage device such as an electrically erasable programmable read-only memory (EEPROM) or a flash memory.

The storage 216 stores an application program 2162 created in accordance with a control target such as a facility or a machine in addition to the system program 2160 for realizing basic functions. The storage 216 further stores model information 2164 indicating the device type or the like of the master device 200 and characteristic information 2166 indicating a network communication function or the like that the master device 200 has.

The master processing unit 202 of the local bus 8 performs a network master process relating to data transmission on the local bus 8. More specifically, the master processing unit 202 includes a master controller 2020, a local bus communication port 202P including a transmitting circuit (TX) 2024 and a receiving circuit (RX) 2026, and a buffer memory 2028.

The local bus 8 is electrically connected to the local bus communication port 202P. The transmitting circuit 2024 generates a communication frame including data that is to be transmitted from the master device 200 via the local bus 8 and sends out the communication frame to the local bus 8. The receiving circuit 2026 receives a communication frame transmitted on the local bus 8 and reconstructs data included in the communication frame.

The buffer memory 2028 temporarily holds data transmitted via the local bus 8.

The master controller 2020 is a processing unit for providing network master processes. More specifically, the master controller 2020 has a device search module 2022. The device search module 2022 acquires state data of each device connected to the local bus 8 and generates configuration information 2021. The master controller 2020 controls the timing and order of data transmission on the local bus 8 on the basis of the generated configuration information 2021.

Further, the slave processing unit 204 of the field network 6 performs a network slave process relating to data transmission on the field network 6. More specifically, the slave processing unit 204 includes a slave controller 2040, a network port 204P1 including a transmitting circuit (TX) 2044 and a receiving circuit (RX) 2046, a buffer memory 2048, and a network port 204P2 including a transmitting circuit (TX) 2045 and a receiving circuit (RX) 2047.

Communication frames transmitted on the field network 6 are sequentially transferred between the network port 204P1 and the network port 204P2. That is, a communication frame arriving at the network port 204P1 is sent out through the network port 204P2, and conversely, a communication frame arriving at the network port 204P2 is sent out through the network port 204P1.

The buffer memory 2048 is disposed between the network port 204P1 and the network port 204P2 to hold a transferred communication frame(s) and output all or part of the communication frame(s) to the slave controller 2040.

The field network 6 extending from an upstream device is electrically connected to the network port 204P1. The transmitting circuit 2044 generates a communication frame and sends out the same to the field network 6 and the receiving circuit 2046 receives a communication frame transmitted on the field network 6 and reconstructs data.

The field network 6 connected to a downstream device is electrically connected to the network port 204P2. The transmitting circuit 2045 generates a communication frame and sends out the same to the field network 6 and the receiving circuit 2047 receives a communication frame transmitted on the field network 6 and reconstructs data.

The slave controller 2040 is a processing unit for providing network slave processes. More specifically, the slave controller 2040 acquires received data included in a prespecified communication frame among communication frames transmitted on the field network 6 and sends out a prespecified communication frame incorporating data to be transmitted.

Although FIG. 5 shows an exemplary configuration in which necessary functions are provided by the processor 212 executing the program, some or all of the provided functions may be implemented by a dedicated hardware circuit (for example, an ASIC or an FPGA).

(b3: Master Device 400)

Figure 6:
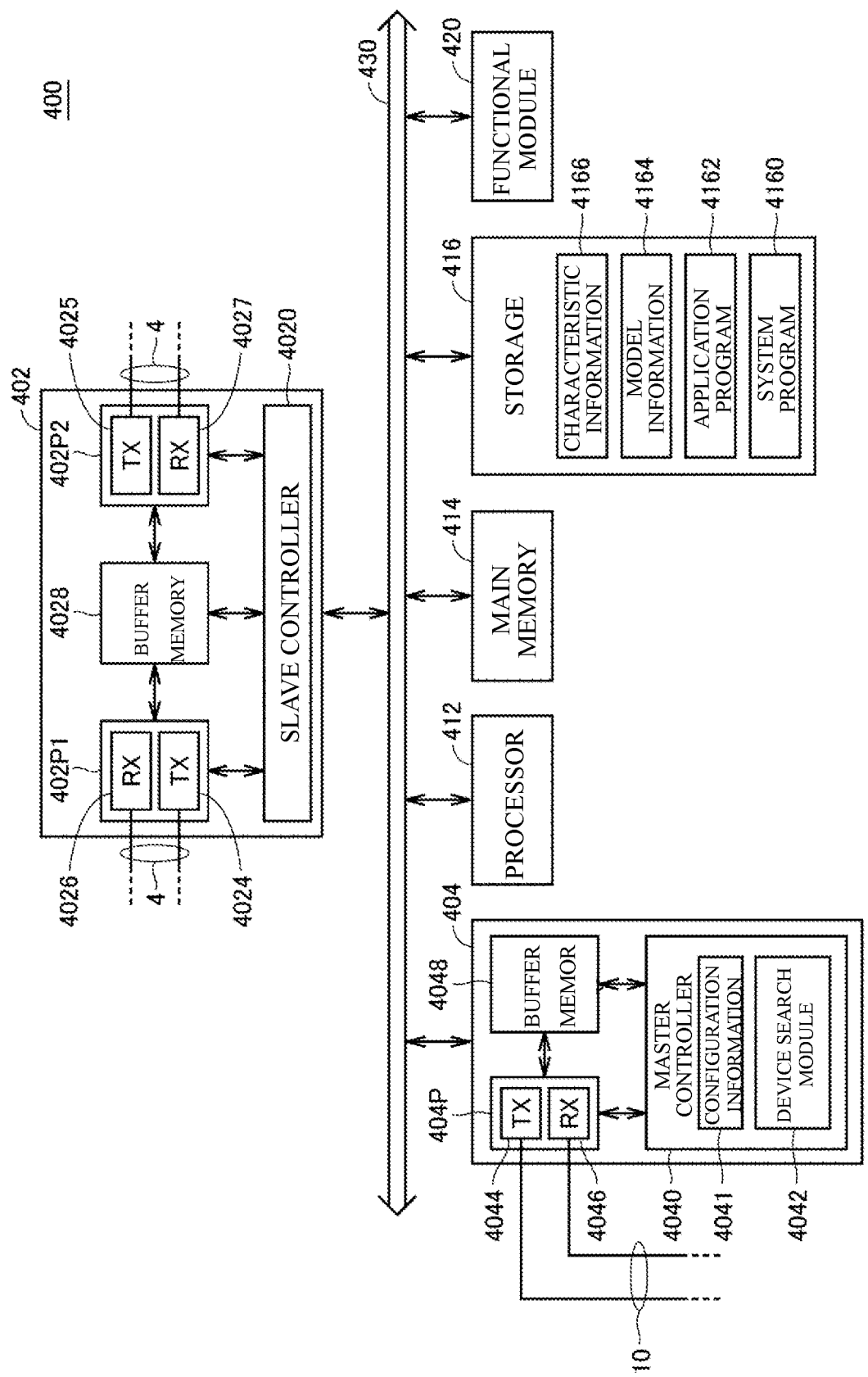
FIG. 6 is a schematic diagram showing an exemplary hardware configuration of a master device included in the network system according to the present embodiment.

FIG. 6 is a schematic diagram showing an exemplary hardware configuration of the master device 400 included in the network system 1 according to the present embodiment. Referring to FIG. 6, the master device 400 includes a processor 412, a main memory 414, a storage 416, and a functional module 420 in addition to the slave processing unit 402 of the local bus 8 and the master processing unit 404 of the field network 10. These components are connected via a processor bus 430.

The processor 412 corresponds to an arithmetic processing unit that performs control calculation or the like and is made of a CPU, a GPU, or the like. Specifically, the processor 412 reads a program (for example, a system program 4160 and an application program 4162) stored in the storage 416, loads the program into the main memory 414, and executes the program to realize predetermined control processing.

The main memory 414 is made of a volatile storage device such as a DRAM or an SRAM or the like. The storage 416 is made of, for example, a nonvolatile storage device such as an EEPROM or a flash memory.

The storage 416 stores an application program 4162 created in accordance with a control target such as a facility or a machine in addition to the system program 4160 for realizing basic functions. The storage 416 further stores model information 4164 indicating the device type or the like of the master device 400 and characteristic information 4166 indicating a network communication function or the like that the master device 400 has.

Further, the slave processing unit 402 of the local bus 4 performs a network slave process relating to data transmission on the local bus 4. More specifically, the slave processing unit 402 includes a slave controller 4020, a network port 402P1 including a transmitting circuit (TX) 4024 and a receiving circuit (RX) 4026, a buffer memory 4028, and a network port 402P2 including a transmitting circuit (TX) 4025 and a receiving circuit (RX) 4027.

Communication frames transmitted on the local bus 4 are sequentially transferred between the network port 402P1 and the network port 402P2. That is, a communication frame arriving at the network port 402P1 is sent out through the network port 402P2, and conversely, a communication frame arriving at the network port 402P2 is sent out through the network port 402P1.

The buffer memory 4028 is disposed between the network port 402P1 and the network port 402P2 to hold a transferred communication frame(s) and output all or part of the communication frame(s) to the slave controller 4020.

The local bus 4 extending from an upstream device is electrically connected to the network port 402P1. The transmitting circuit 4024 generates a communication frame and sends out the same to the local bus 4 and the receiving circuit 4026 receives a communication frame transmitted on the local bus 4 and reconstructs data.

The local bus 4 connected to a downstream device is electrically connected to the network port 402P2. The transmitting circuit 4025 generates a communication frame and sends out the same to the local bus 4 and the receiving circuit 4027 receives a communication frame transmitted on the local bus 4 and reconstructs data.

The slave controller 4020 is a processing unit for providing network slave processes. More specifically, the slave controller 4020 acquires received data included in a prespecified communication frame among communication frames transmitted on the local bus 4 and generates and sends out a communication frame incorporating data to be transmitted.

Further, the master processing unit 404 of the field network 10 performs a network master process relating to data transmission on the field network 6. More specifically, the master processing unit 404 includes a master controller 4040, a network port 404P including a transmitting circuit (TX) 4044 and a receiving circuit (RX) 4046, and a buffer memory 4048.

The field network 10 is electrically connected to the network port 404P. The transmitting circuit 4044 generates a communication frame including data that is to be transmitted via the field network 10 and sends out the communication frame to the field network 10. The receiving circuit 4046 receives a communication frame transmitted on the field network 10 and reconstructs data included in the communication frame.

The buffer memory 4048 temporarily holds data transmitted via the field network 10.

The master controller 4040 is a processing unit for providing network master processes. More specifically, the master controller 4040 has a device search module 4042. The device search module 4042 acquires state data of each device connected to the field network 10 and generates configuration information 4041. The master controller 4040 controls the timing and order of data transmission on the field network 10 on the basis of the configuration information 4041.

Although FIG. 6 shows an exemplary configuration in which necessary functions are provided by the processor 412 executing the program, some or all of the provided functions may be implemented by a dedicated hardware circuit (for example, an ASIC or an FPGA).

(b4: Slave Device 300)

Figure 7:
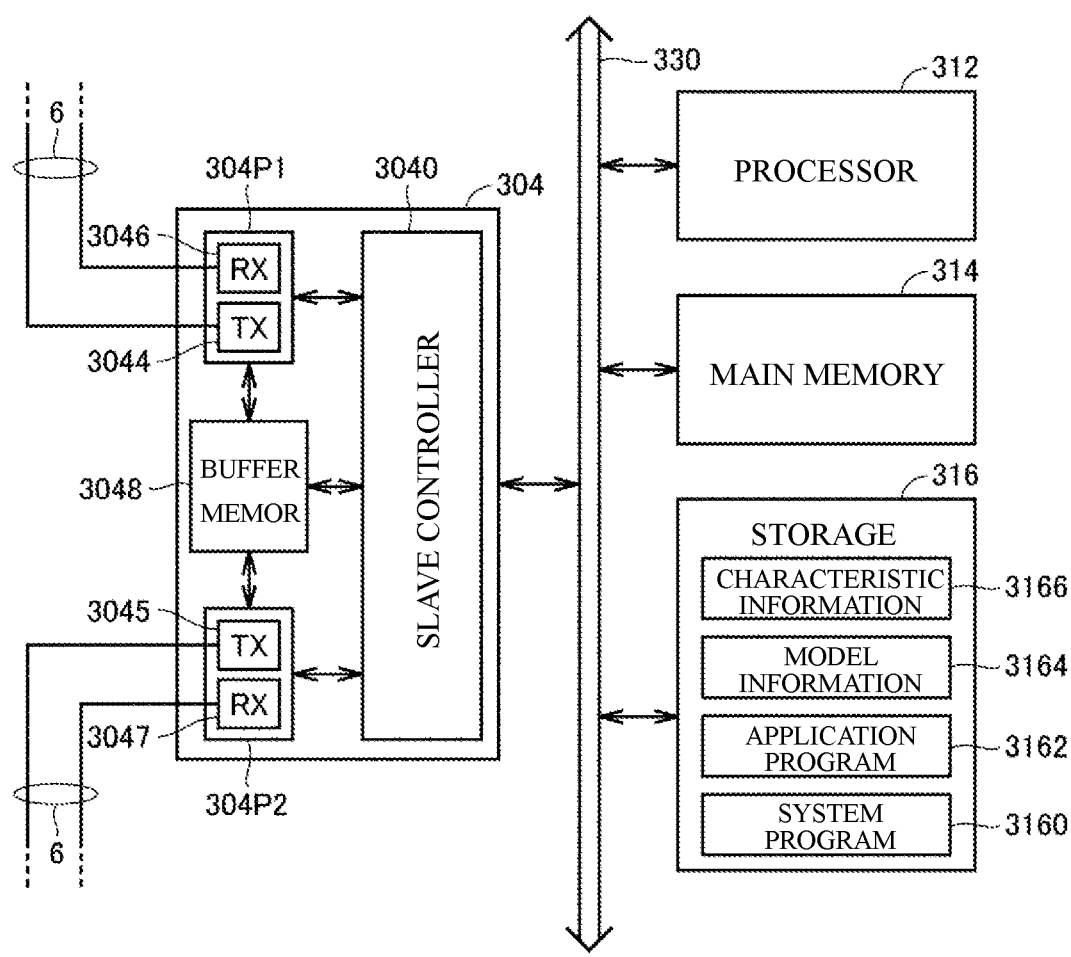
FIG. 7 is a schematic diagram showing an exemplary hardware configuration of a slave device included in the network system according to the present embodiment.

FIG. 7 is a schematic diagram showing an exemplary hardware configuration of a slave device 300 included in the network system 1 according to the present embodiment. The configuration of the slave device 300 shown in FIG. 7 is substantially the same as that of the master device 200 shown in FIG. 5 from which the master processing unit 202 has been removed.

More specifically, the slave device 300 includes a processor 312, a main memory 314, and a storage 316 in addition to the slave processing unit 304 of the field network 6. These components are connected via a processor bus 330.

The storage 316 stores a system program 3160, an application program 3162, model information 3164, and characteristic information 3166.

The slave processing unit 304 includes a slave controller 3040, a network port 304P1 including a transmitting circuit (TX) 3044 and a receiving circuit (RX) 3046, a buffer memory 3048, and a network port 304P2 including a transmitting circuit (TX) 3045 and a receiving circuit (RX) 3047.

Functions and operations of the parts of the slave device 300 are similar to corresponding parts of the master device 200 shown in FIG. 5 and detailed descriptions thereof will not be repeated.

(b5: Slave Device 500)

Figure 8:
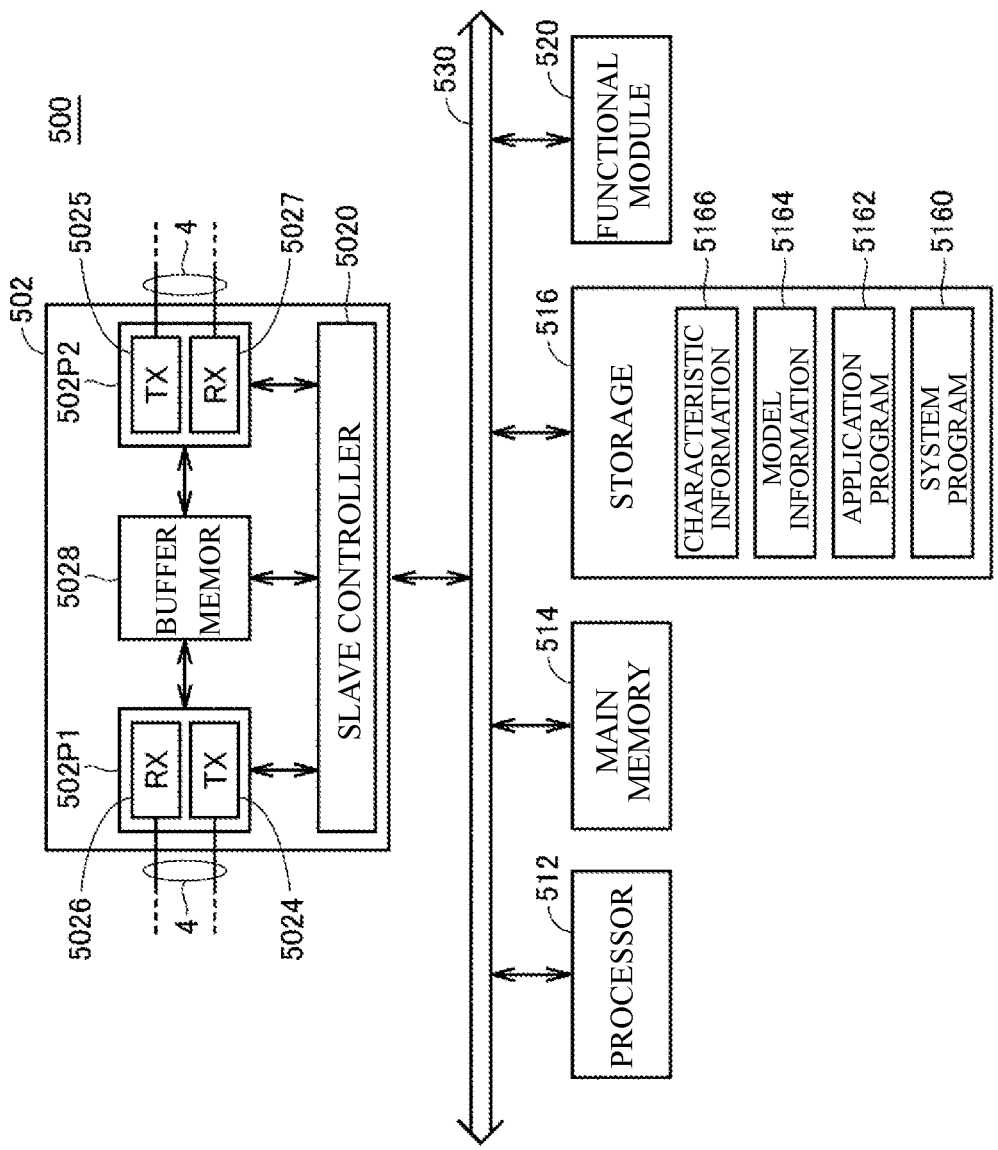
FIG. 8 is a schematic diagram showing an exemplary hardware configuration of a slave device included in the network system according to the present embodiment.

FIG. 8 is a schematic diagram showing an exemplary hardware configuration of a slave device 500 included in the network system 1 according to the present embodiment. The configuration of the slave device 500 shown in FIG. 8 is substantially the same as that of the master device 400 shown in FIG. 5 from which the master processing unit 400 has been removed.

More specifically, the slave device 500 includes a processor 512, a main memory 514, and a storage 516 in addition to the slave processing unit 502 of the local bus 4. These components are connected via a processor bus 530.

The storage 516 stores a system program 5160, an application program 5162, model information 5164, and characteristic information 5166.

The slave processing unit 502 includes a slave controller 5020, a network port 502P1 including a transmitting circuit (TX) 5024 and a receiving circuit (RX) 5026, a buffer memory 5028, and a network port 502P2 including a transmitting circuit (TX) 5025 and a receiving circuit (RX) 5027.

Functions and operations of the parts of the slave device 500 are similar to corresponding parts of the slave device 300 shown in FIG. 7 and detailed descriptions thereof will not be repeated.

<C. Characteristic Information and Configuration Information>

Next, an example of information included in the characteristic information 1166, 2166, 3166, 4166, or 5166 held by each device and an example of configuration information generated from the characteristic information will be described.

Each piece of characteristic information indicates a network communication function that a corresponding device has. Specifically, the characteristic information includes information such as information regarding which network (protocol) the device supports, whether or not the device functions as a master processing unit in the corresponding network (protocol), and whether or not the device has a function of generating multilayer network configuration information. The characteristic information is stored in a nonvolatile storage area such as the storage of each device.

Figure 9:
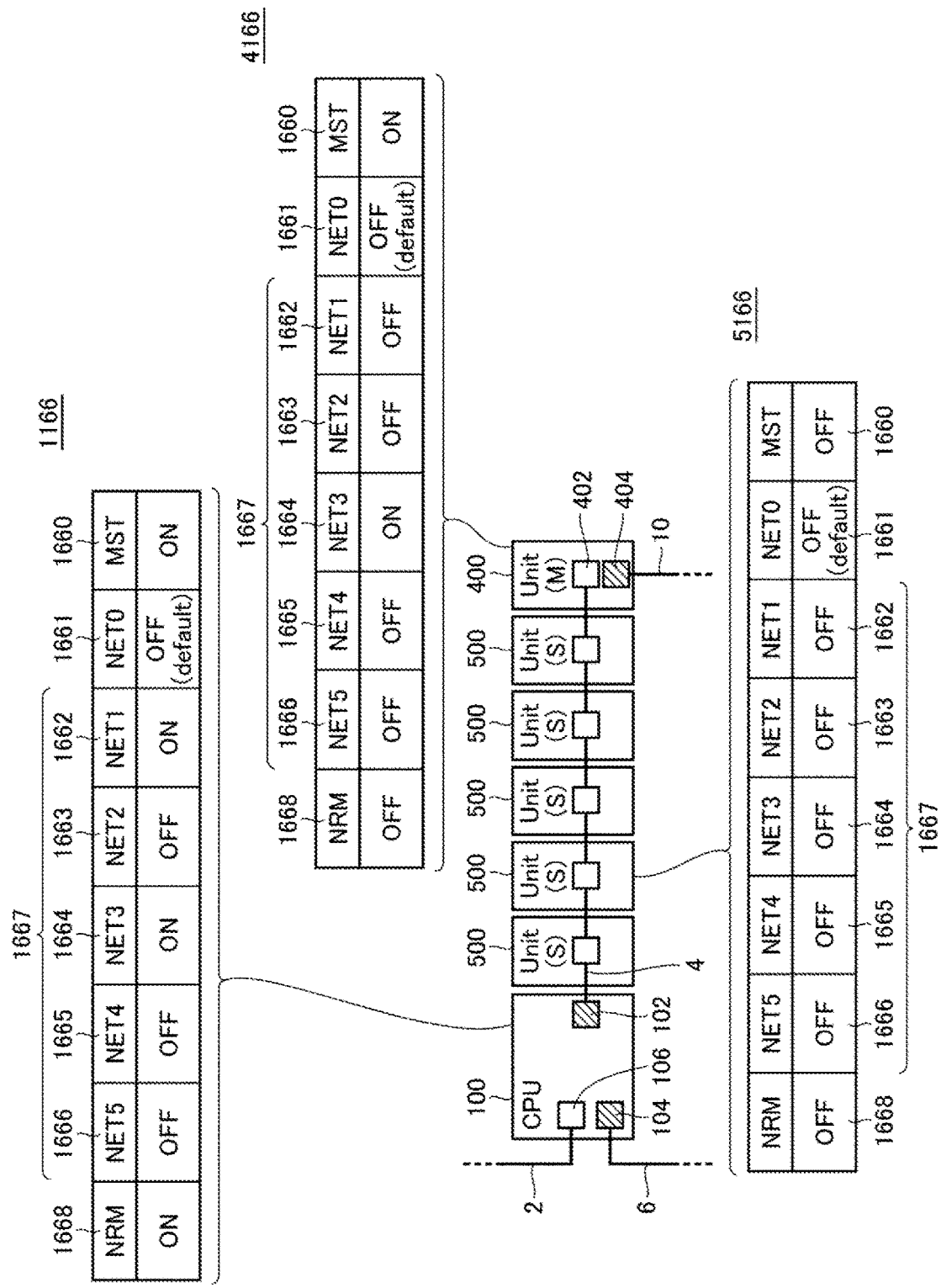
FIG. 9 is a diagram showing an example of characteristic information used in the network system according to the present embodiment.

FIG. 9 is a diagram showing an example of the characteristic information used in the network system 1 according to the present embodiment. Specifically, FIG. 9 shows an example of the characteristic information 1166, 4166, and 5166 held by each device in a configuration which includes the controller 100, a plurality of slave devices 500, and the master device 400. Each of the characteristic information 1166, 4166, and 5166 presents necessary information according to a predetermined format. In the present embodiment, each of the characteristic information 1166, 4166, and 5166 expresses various types of information using a bit representation.

Each of the characteristic information 1166, 4166, and 5166 includes a master flag 1660, a standard network flag 1661, additional network flags 1662, 1663, 1664, 1665, and 1666 (an additional network flag group 1667), and a network resource manager flag 1668.

The master flag (MST) 1660 corresponds to information indicating the presence or absence of a master processing unit. That is, the master flag 1660 indicates whether or not to perform a network master process in an additional network included in the additional network flag group 1667. If the master flag 1660 is "ON," this indicates that the device functions as a master processing unit (i.e., is a master device) in an additional network.

The standard network flag 1661 indicates a standard network in which the device mainly performs data transmission. The standard network flag 1661 is normally set to "OFF."

The additional network flag group 1667 corresponds to information indicating the types of protocols supported by each device. Specifically, the additional network flags 1662, 1663, 1664, 1665, and 1666 included in the additional network flag group 1667 are provided for respective protocols, and when the device supports an additional network other than the standard network, a corresponding additional network flag included in the additional network flag group 1667 is set to "ON."

The network resource manager (NRM) flag 1668 corresponds to information indicating the presence or absence of the network resource manager 140. That is, the NRM flag 1668 indicates whether or not the device has a function of generating multilayer network configuration information (details of which will be described later). If the NRM flag 1668 is "ON," it indicates that the device can generate multilayer network configuration information.

In the exemplary configuration shown in FIG. 9, the controller 100 has the local bus 4 as a standard network. The controller 100 further has the upper network 2 and the field network 6 as additional networks. Therefore, the additional network flag 1662 and the additional network flag 1664 corresponding to the additional networks are set to "ON" in the characteristic information 1166 corresponding to the controller 100. Further, since the controller 100 is a master device in the field network 6, the master flag 1660 is set to "ON" in the characteristic information 1166. The NRM flag 1668 is also set to "ON" in the characteristic information 1166 since the controller 100 has a function of generating multilayer network configuration information as will be described later.

The master device 400 has the local bus 4 as a standard network. The master device 400 further has the field network 10 as an additional network. Therefore, the corresponding additional network flag 1664 is set to "ON" in the characteristic information 4166 corresponding to the master device 400. Further, since the master device 400 is a master device in the field network 10, the master flag 1660 is set to "ON" in the characteristic information 4166.

The slave device 500 has the local bus 4 as a standard network and has no additional networks. Therefore, besides the standard network flag 1661, each flag remains "OFF" in the characteristic information 5166 corresponding to the slave device 500.

There are devices that logically support a network although they have no network ports. Even when a device logically supports a network, an additional network flag corresponding to the supported network may be set to "ON."

Figure 10:
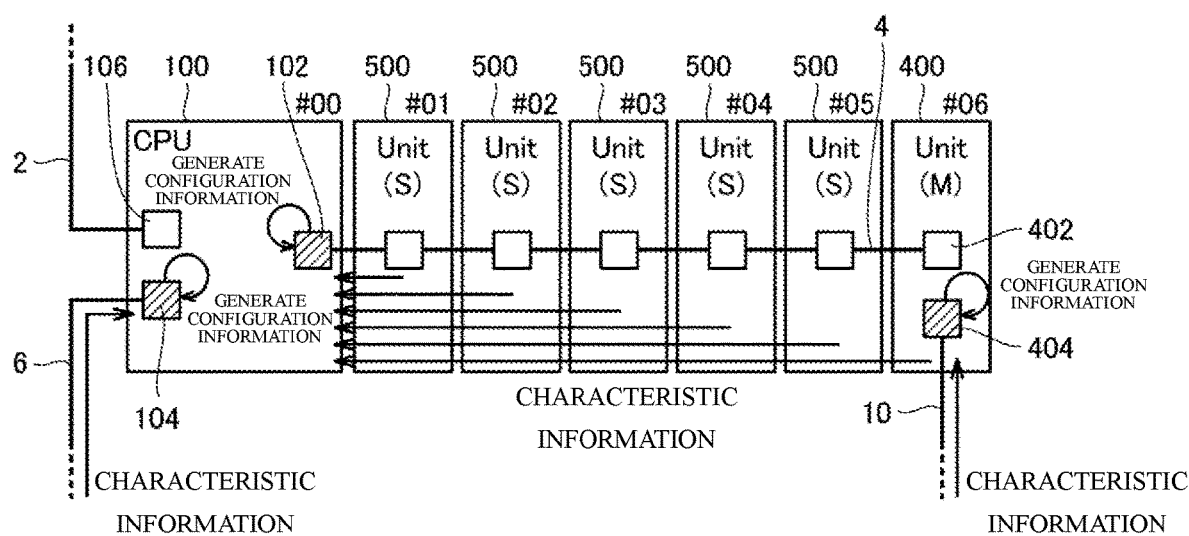
FIG. 10 is a schematic diagram illustrating a procedure of generating configuration information by a master processing unit of the network system according to the present embodiment.

FIG. 10 is a schematic diagram illustrating a procedure of generating configuration information by a master processing unit of the network system 1 according to the present embodiment. Referring to FIG. 10, when identifying a network configuration such as when an initialization process is performed, the master processing unit of each network acquires characteristic information from each device connected to the target network and generates configuration information (configuration information 1021, 1041, 2021, and 4041). That is, each master processing unit (the device search module in the master controller) acquires characteristic information from each of one or a plurality of slave processing units connected to a network managed by the master processing unit to generate configuration information indicating information of devices connected to each network (single-layer network configuration information).

More specifically, the master processing unit 102 of the controller 100 acquires characteristic information from each device connected to the local bus 4 and generates configuration information (the configuration information 1021 shown in FIG. 4). Similarly, the master processing unit 104 of the controller 100 acquires characteristic information from each device connected to the field network 6 and generates configuration information (the configuration information 1041 shown in FIG. 4).

Further, the master processing unit 404 of the master device 400 acquires characteristic information from each device connected to the field network 10 and generates configuration information (the configuration information 4041 shown in FIG. 6).

FIG. 11 is a schematic diagram showing an example of configuration information generated by a master processing unit of the network system 1 according to the present embodiment. Referring to FIG. 11, for example, the configuration information 1021 generated by the master processing unit 102 of the controller 100 includes characteristic information acquired respectively from the devices connected to the local bus 4.

By referring to the configuration information 1021, the master processing unit 102 can specify a device which further has another network from among the devices connected to the network managed by the master processing unit 102. Thus, by using characteristic information and configuration information, it is possible to easily specify the presence of a branch from one network to another network.

As described above, in the present embodiment, each device holds characteristic information that indicates whether or not it is a master device and thus, for example, it is not necessary to determine whether or not the device is a master device by the application itself executed by the master processing unit. Therefore, in the master processing unit, it is not necessary to prepare logic such as that for determining whether or not each device is a master device from the model information of each device and thus it is possible to increase versatility and compatibility.

In addition, as shown in FIGS. 10 and 11, the formats of the configuration information held by master processing units are unified regardless of the difference between protocols supported by the master processing units, and therefore that it is possible to maintain versatility.

<D. Process of Generating Multilayer Network Configuration Information>

Next, a process of generating multilayer network configuration information in the network system 1 according to the present embodiment will be described.

(d1: Outline of Generation Process)

Figure 12B:
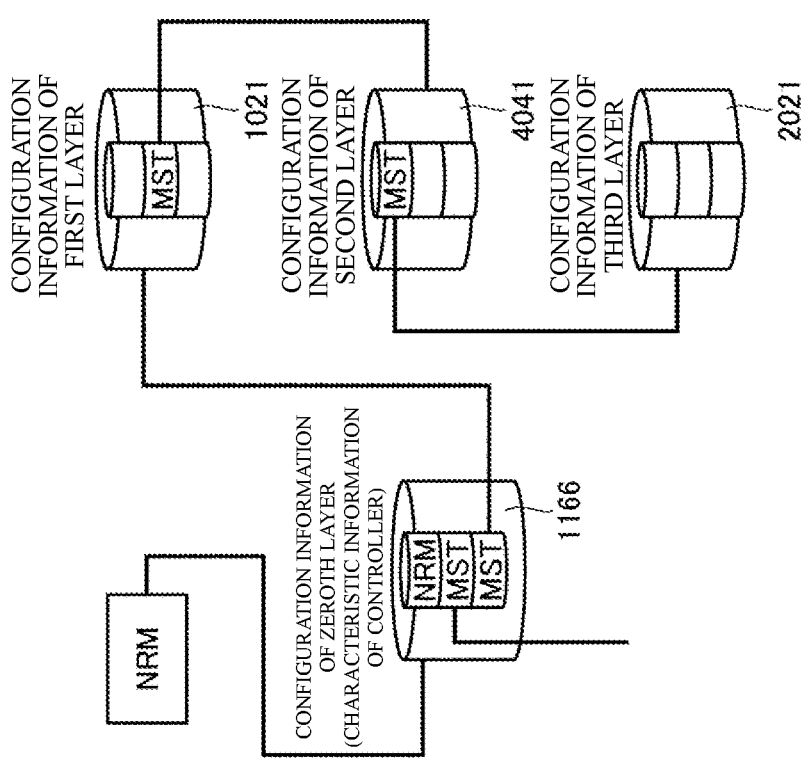
FIGS. 12(A) and 12(B) are diagrams illustrating an example of a process of generating multilayer network configuration information in the network system according to the present embodiment.
Figure 12A:
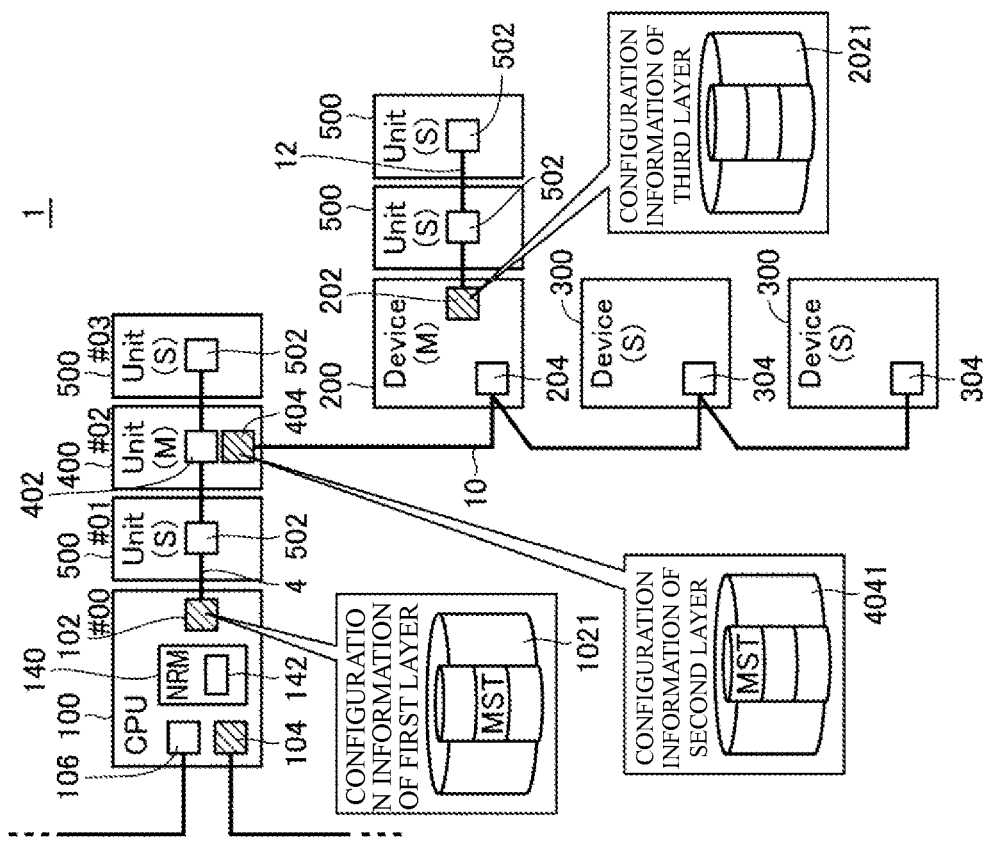

FIGS. 12(A) and 12(B) are diagrams illustrating an example of a process of generating multilayer network configuration information in the network system 1 according to the present embodiment. Multilayer network configuration information 142 as shown in FIG. 12(B) is generated for a network configuration shown in FIG. 12(A).

First, the network resource manager 140 acquires characteristic information 1166 held by the controller 100 and generates multilayer network configuration information of the zeroth layer. Subsequently, the network resource manager 140 refers to the generated multilayer network configuration information of the zeroth layer (characteristic information 1166) and transmits a configuration information acquiring command to each master processing unit defined in the multilayer network configuration information of the zeroth layer. Here, if no master processing units are defined, the process of transmitting the configuration information acquiring command is not performed.

In this manner, the network resource manager 140 refers to configuration information (single-layer network configuration information) generated by the master processing units 102 and 104 of the controller 100 to specify the master devices (the master processing units) connected to the networks (the local bus 4 and the field network 6) managed by the controller 100.

In the example shown in FIG. 12(A) and FIG. 12(B), a configuration information acquiring command is transmitted to each of the master processing units 102 and 104 from the network resource manager 140. As a result, the network resource manager 140 acquires the configuration information 1021 held by the master processing unit 102 and the configuration information 1041 held by the master processing unit 104. The acquired configuration information becomes multilayer network configuration information of the next layer, that is, the first layer.

In this manner, the network resource manager 140 refers to configuration information (single-layer network configuration information) generated by master processing units of master devices in networks of the next layer to acquire configuration information (single-layer network configuration information) for the networks of the next layer managed by the master devices.

As shown in FIG. 12(B), the acquired multilayer network configuration information of the first layer (the configuration information 1021) is nested in the master processing unit corresponding to the multilayer network configuration information of the zeroth layer (the characteristic information 1166). Although the configuration information 1041 is not shown in the figure for the convenience of illustration, the configuration information 1041 is nested in the master processing unit corresponding to the multilayer network configuration information of the zeroth layer (the characteristic information 1166), similar to the configuration information 1021.

Further, a configuration information acquiring command is transmitted from the network resource manager 140 to the master processing unit 404. As a result, the network resource manager 140 acquires configuration information 4041 held by the master processing unit 404. The acquired configuration information becomes multilayer network configuration information of the next layer, that is, the second layer.

In this manner, the network resource manager 140 refers to configuration information (single-layer network configuration information) for a network of the next layer to specify a master device connected to the network of the next layer. The network resource manager 140 refers to the configuration information (the single-layer network configuration information) generated by the specified master device to acquire configuration information (single-layer network configuration information) for a network of the further next layer managed by the specified master device.

As shown in FIG. 12(B), the acquired multilayer network configuration information of the second layer (the configuration information 4041) is nested in the master processing unit corresponding to the multilayer network configuration information of the first layer (the configuration information 1021).

Further, a configuration information acquiring command is transmitted from the network resource manager 140 to the master processing unit 202. As a result, the network resource manager 140 acquires configuration information 2021 held by the master processing unit 202. This acquired configuration information becomes multilayer network configuration information of the next layer, that is, the third layer. As shown in FIG. 12(B), the acquired multilayer network configuration information of the third layer (the configuration information 2021) is nested in the master processing unit corresponding to the multilayer network configuration information of the third layer (the configuration information 4041).

In this manner, until there is no master processing unit on the network, the network resource manager 140 repeatedly transmits a configuration information acquiring command and generates multilayer network configuration information 142 in its own device (the controller 100 in this case). That is, the network resource manager 140 of the controller 100 acquires configuration information (single-layer network configuration information) from each of the master processing units included in the network system 1 to generate multilayer network configuration information 142 indicating the connection relationships of the devices in the network system 1.

In addition, the network resource manager 140 associates (that is, nests) pieces of configuration information acquired from master processing units included in the network system 1 with each other on the basis of the positions of master devices present on networks to generate multilayer network configuration information 142.

Since the protocols of networks may be different, the configuration information acquiring command may be encapsulated and transmitted between the networks. Such an encapsulation process will be described later in detail.

Although the multilayer network configuration information 142 is generated through the procedure described above, the network configuration may be changed due to addition or removal of a device or the like. Therefore, the network resource manager 140 may periodically send a configuration information change acquiring command to each master processing unit. Such periodic transmission of a configuration information change acquiring command allows the multilayer network configuration information 142 to follow network configuration changes although there is some delay.

Figure 13:
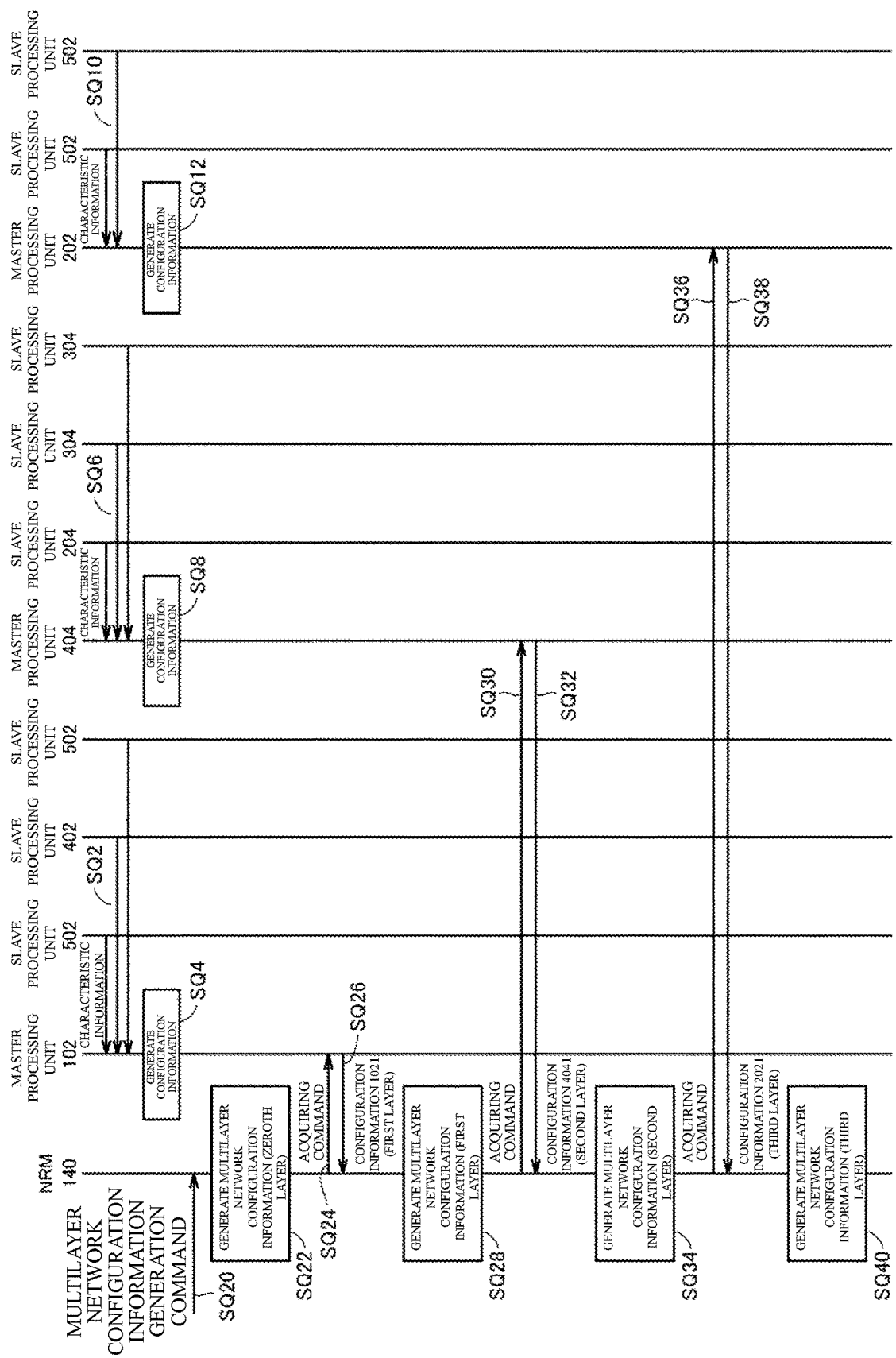
FIG. 13 is a sequence diagram relating to the process of generating multilayer network configuration information shown in FIGS. 12(A) and 12(B).

FIG. 13 is a sequence diagram relating to the process of generating multilayer network configuration information shown in FIG. 12(A) and FIG. 12(B). Referring to FIG. 13, when an initialization process or the like is performed, a master processing unit searches for devices on a network managed by the master processing unit and generates multilayer network configuration information of the network. This multilayer network configuration information is generated according to a predetermined common format.

More specifically, the master processing unit 102 of the controller 100 acquires characteristic information from each of the devices (the slave processing units 402 and 502) present on the local bus 4 managed by the master processing unit 102 (sequence SQ2) and generates configuration information 1021 (sequence SQ4).

Similarly, the master processing unit 404 of the master device 400 acquires characteristic information from each of the devices (the slave processing units 204 and 304) present on the field network 10 managed by the master device 400 (sequence SQ4) and generates configuration information 4041 (sequence SQ6).

Similarly, the master processing unit 202 of the master device 200 acquires characteristic information from each of the devices (the slave processing units 502) present on the local bus 12 managed by the master processing unit 202 (sequence SQ10) and generates configuration information 2021 (sequence SQ12).

Then, upon receiving a command to generate multilayer network configuration information (sequence SQ20), the network resource manager 140 acquires characteristic information 1166 from its own device (the controller 100) and generates multilayer network configuration information of the zeroth layer (sequence SQ22).

Subsequently, the network resource manager 140 refers to the multilayer network configuration information of the zeroth layer to specify the presence of a master processing unit of the first layer and transmits a configuration information acquiring command to the specified master processing unit 102 (sequence SQ24). The network resource manager 140 acquires configuration information 1021 returned as a response to the configuration information acquiring command (sequence SQ26) and adds the acquired configuration information 1021 as multilayer network configuration information of the first layer (sequence SQ28).

Subsequently, the network resource manager 140 refers to the multilayer network configuration information of the first layer to specify the presence of a master processing unit of the second layer and transmits a configuration information acquiring command to the specified master processing unit 404 (sequence SQ30). The network resource manager 140 acquires configuration information 4041 returned as a response to the configuration information acquiring command (sequence SQ32) and adds the acquired configuration information 4041 as multilayer network configuration information of the second layer (sequence SQ34).

Subsequently, the network resource manager 140 refers to the multilayer network configuration information of the second layer to specify the presence of a master processing unit of the third layer and transmits a configuration information acquiring command to the specified master processing unit 202 (sequence SQ36). The network resource manager 140 acquires configuration information 2021 returned as a response to the configuration info illation acquiring command (sequence SQ38) and adds the acquired configuration information 2021 as multilayer network configuration information of the third layer (sequence SQ40).

In the example shown in FIG. 12(A) and FIG. 12(B), the multilayer network configuration information 142 is generated at this point of time since there is no layer lower than the third layer.

(d2: Process when there are a Plurality of Network Resource Managers: Part 1)

A network system may include a plurality of controllers, where network resource managers 140 are arranged respectively in the controllers. In this case, a process for avoiding contention between the network resource managers 140 may be adopted.

A method of generating multilayer network configuration information 142 when there are a plurality of network resource managers 140 in the network system will be described below.

Figures 14A, 14B:
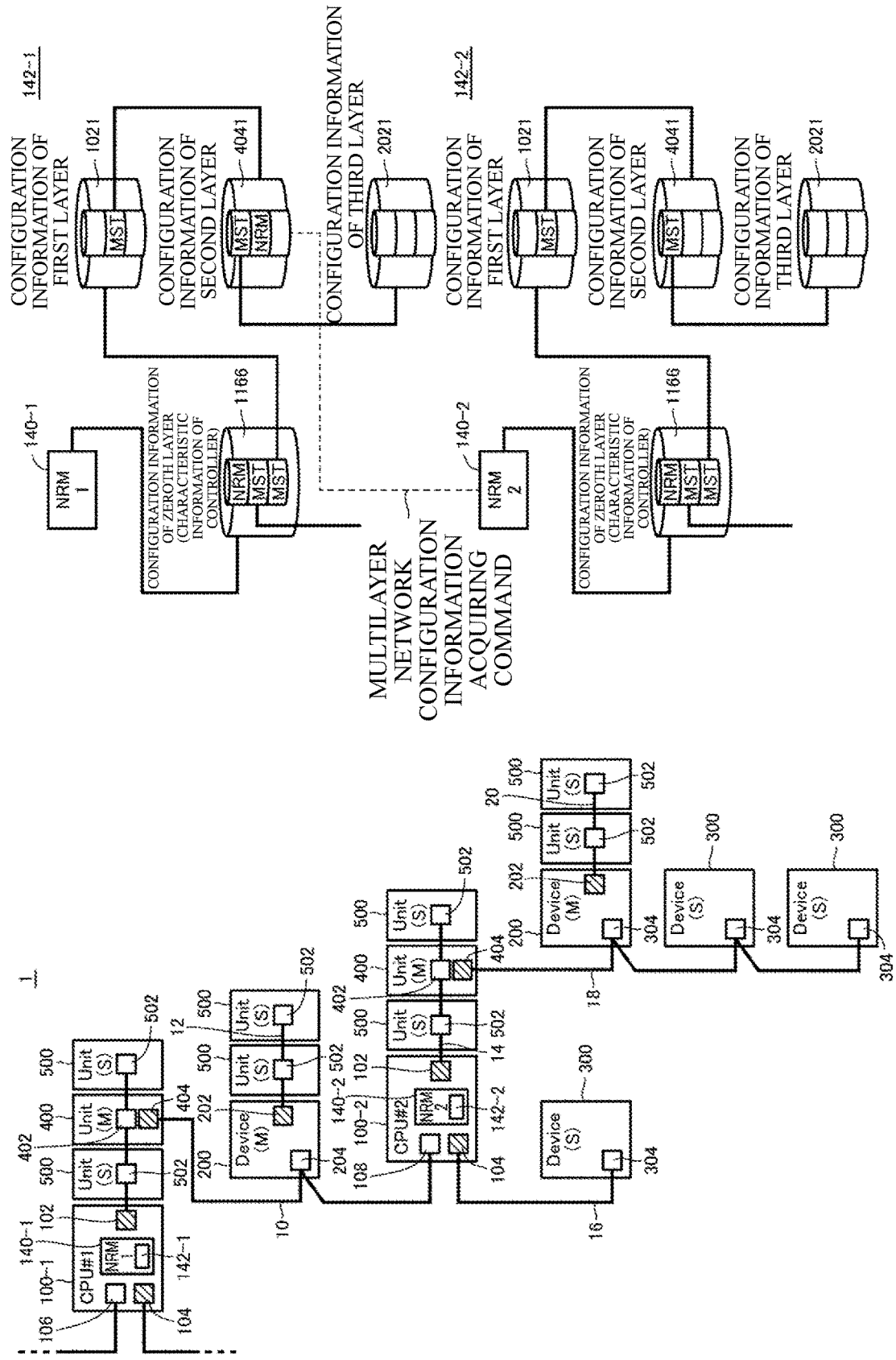
FIGS. 14(A) and 14(B) are diagrams illustrating another example of the process of generating multilayer network configuration information in the network system according to the present embodiment.

FIGS. 14(A) and 14(B) are diagrams illustrating another example of the process of generating multilayer network configuration information in a network system 1 according to the present embodiment. The network system 1 shown in FIG. 14(A) includes a plurality of controllers 100-1 and 100-2.

The controller 100-2 is connected to a field network 10 as a slave on the field network 10 which extends from a master device 400 (a master processing unit 404). That is, the controller 100-2 has a slave processing unit 108 connected to the field network 10.

A master device 400 is connected to a local bus 14 extending from a master processing unit 102 of the controller 100-2 and a master device 200 (a slave processing unit 204) is connected to a field network 18 extending from a master processing unit 104 of the master device 400. Further, a local bus 20 is connected to a master processing unit 202 of the master device 200.

The controllers 100-1 and 100-2 have network resource managers 140-1 and 140-2, respectively.

In the configuration of the network system as shown in FIG. 14(A), the network resource manager 140-1 of the controller 100-1 and the network resource manager 140-2 of the controller 100-2 generate multilayer network configuration information 142-1 and 142-2, respectively.

More specifically, as shown in FIG. 14(B), the network resource manager 140-1 of the controller 100-1 acquires characteristic information 1166 held by the controller 100-1 and generates multilayer network configuration information of the zeroth layer of the multilayer network configuration information 142-1. Likewise, the network resource manager 140-1 sequentially transmits a configuration information acquiring command to each master processing unit and updates the multilayer network configuration information 142-1.

Similarly, the network resource manager 140-2 of the controller 100-2 acquires characteristic information 1166 held by the controller 100-2 and generates multilayer network configuration information of the zeroth layer of the multilayer network configuration information 142-2. Likewise, the network resource manager 140-2 sequentially transmits a configuration information acquiring command to each master processing unit and updates the multilayer network configuration information 142-2.

In the network system 1 shown in FIG. 14(A) and FIG. 14(B), the controller 100-2 is present on the field network 10 extending from the master processing unit 404 of the master device 400. Therefore, when acquiring multilayer network configuration information of the second layer (configuration information 4041), the network resource manager 140-1 of the controller 100-1 identifies a device whose NRM flag 1668 is set to "ON".

In this case, a network resource manager of the identified device should generate multilayer network configuration information of subsequent layers. Therefore, the network resource manager 140-1 of the controller 100-1 transmits a multilayer network configuration information acquiring command, rather than a configuration information acquiring command for acquiring configuration information, to the device having the network resource manager 140-2. Then, the network resource manager 140-1 nests multilayer network configuration information returned as a response to the multilayer network configuration information acquiring command in the device having the network resource manager corresponding to the multilayer network configuration information of the second layer (the configuration information 4041).

The network system 1 shown in FIG. 14(A) and FIG. 14(B) has a plurality of controllers. When a network resource manager 140 of one controller has identified a network resource manager 140 of another controller under such circumstances, the network resource manager 140 of the one controller requests multilayer network configuration information generated by the identified network resource manager 140 from the identified network resource manager 140. Adoption of this process ensures that, even when a plurality of network resource managers are included in the same network system, overall multilayer network configuration information of the network system can be generated by combining a plurality of multilayer network configuration information generated by the network resource managers without causing contention between search processes of the network resource managers.

By adopting such a process for avoiding contention as described above, it is possible to generate multilayer network configuration information more efficiently.

(d3: Process when there are a Plurality of Network Resource Managers: Part 2)

Although a method of avoiding contention by allowing each network resource manager 140 to identify the presence of another network resource manager 140 has been shown in the above description, a search range may be preset for each network resource manager 140.

Figure 15:
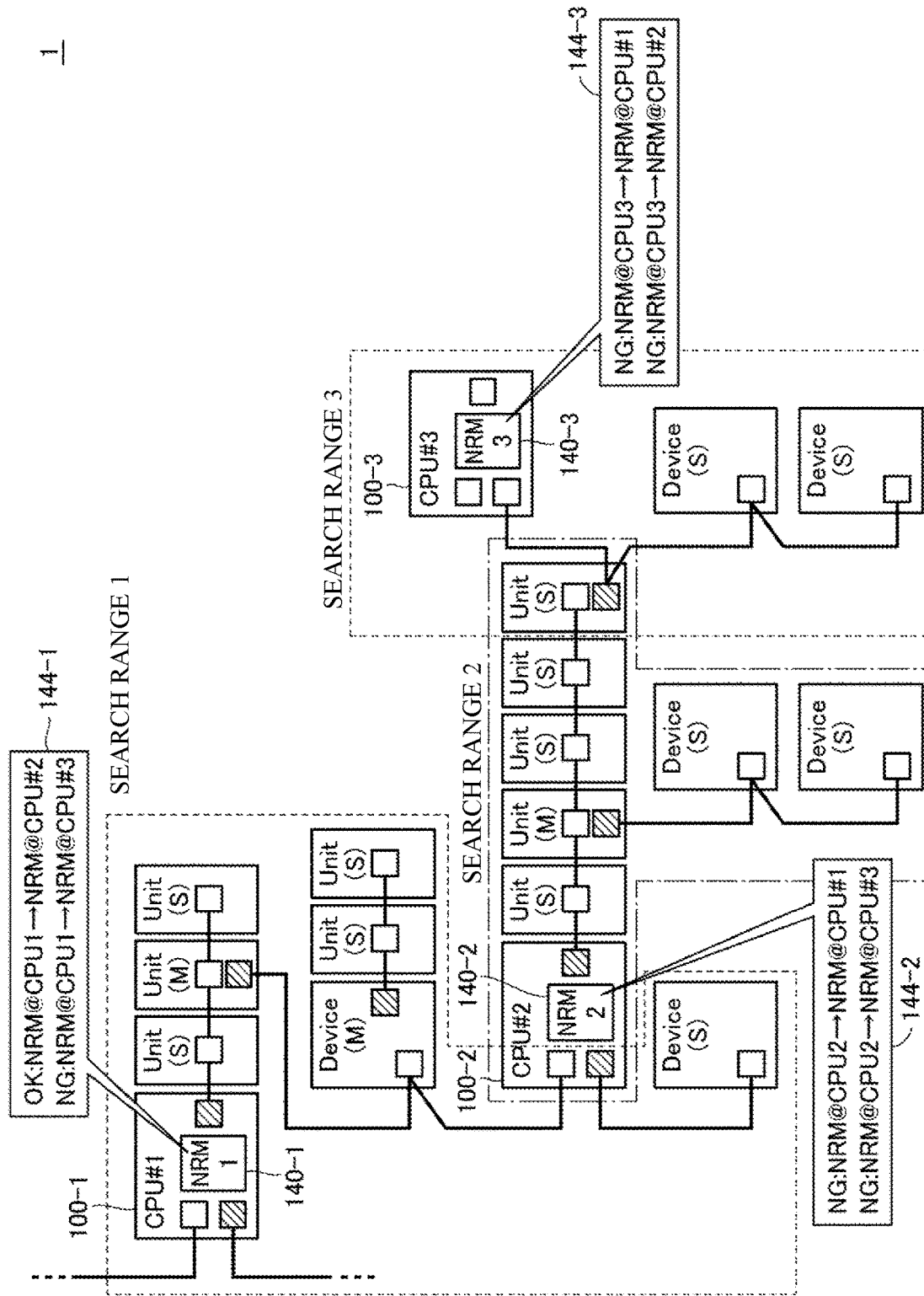
FIG. 15 is a diagram illustrating a method for avoiding contention in a process of generating multilayer network configuration information in the network system according to the present embodiment.

FIG. 15 is a diagram illustrating a method for avoiding contention in a process of generating multilayer network configuration information in a network system 1 according to the present embodiment. The network system 1 shown in FIG. 15 includes three controllers 100-1, 100-2, and 100-3. The controllers 100-1, 100-2, and 100-3 have network resource managers 140-1, 140-2, and 140-3, respectively.

In the network system 1 shown in FIG. 15, search range settings 144-1, 144-2, and 144-3 are provided for the network resource managers 140-1, 140-2, and 140-3, respectively.

The search range setting 144-1 indicates that the controller 100-1 is allowed to search for devices on a network managed by the controller 100-2 but not allowed to search for devices on a network managed by the controller 100-3.

Further, the search range setting 144-2 indicates that the controller 100-2 is not allowed to search for devices on networks managed by the controllers 100-1 and 100-3. Similarly, the search range setting 144-3 indicates that the controller 100-3 is not allowed to search for devices on networks managed by the controllers 100-1 and 100-2.

By adopting the search range settings 144-1, 144-2, and 144-3, it is possible to logically set search ranges 1 to 3 which do not contend with each other as shown in FIG. 15.

As shown in FIG. 15, each of the network resource managers 140 may search for devices included in the network system 1 within a range defined by a preset search range setting. Adoption of such a process ensures that it is possible to suppress contention in a process of generating multilayer network configuration information by presetting a range to be searched and managed for each network resource manager 140 present in the network system 1. It is to be noted that the search range settings 144 may be dynamically set by an application executed on the HMI device 600 or the support device 700.

(d4: Processing Procedure: Network Resource Manager 140)

Next, a processing procedure of a process of generating multilayer network configuration information in the network system 1 according to the present embodiment will be described.

Figure 16:
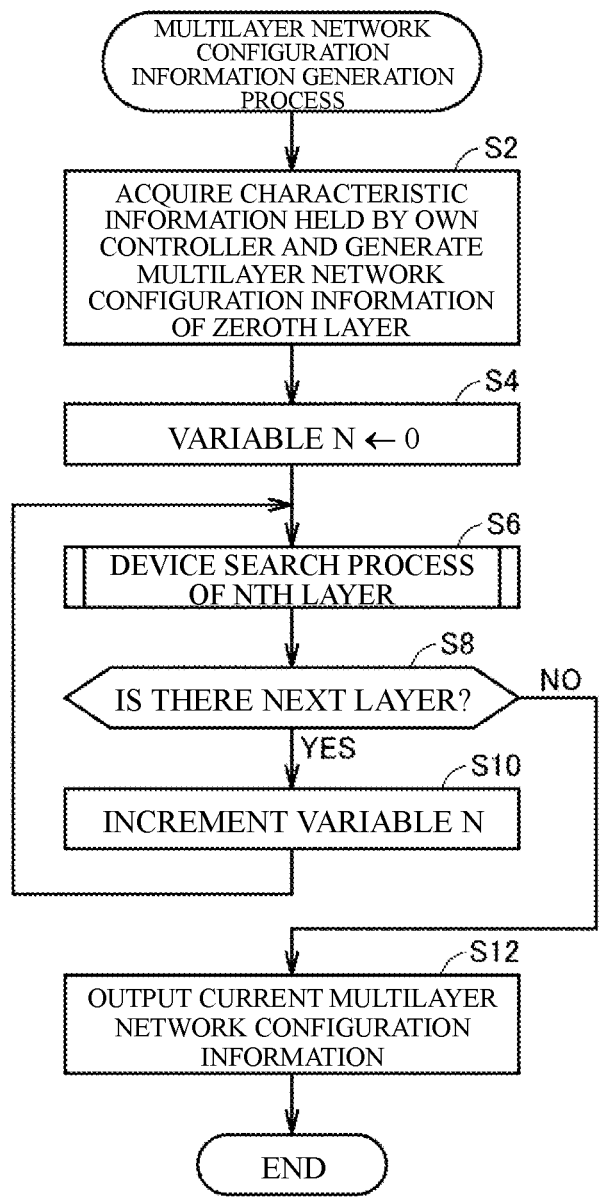
FIG. 16 is a flowchart showing a processing procedure of a process of generating multilayer network configuration information by a network resource manager in the network system according to the present embodiment.

FIG. 16 is a flowchart showing a processing procedure of a process of generating multilayer network configuration information by the network resource manager 140 in the network system 1 according to the present embodiment. Each step shown in FIG. 16 is realized by the processor 112 of the controller 100 executing the system program 1160.

Referring to FIG. 16, first, the network resource manager 140 acquires characteristic information 1166 held by its own controller and generates multilayer network configuration information of the zeroth layer (step S2). Here, a variable N is set to 0 (zero) (step S4).

Subsequently, the network resource manager 140 performs a device search process of the Nth layer on the basis of multilayer network configuration information of the Nth layer (step S6). Details of the device search process of each layer will be described later.

The network resource manager 140 determines whether or not there is a next layer on the basis of the multilayer network configuration information updated in step S6 (step S8). If there is a next layer (YES in step S8), the network resource manager 140 increments the variable N (variable N←variable N+1) (step S10) and performs the processing of step S6 onward.

If there is no next layer (NO in step S8), the network resource manager 140 outputs the current multilayer network configuration information (step S12). Then, the process is terminated.

Figure 17:
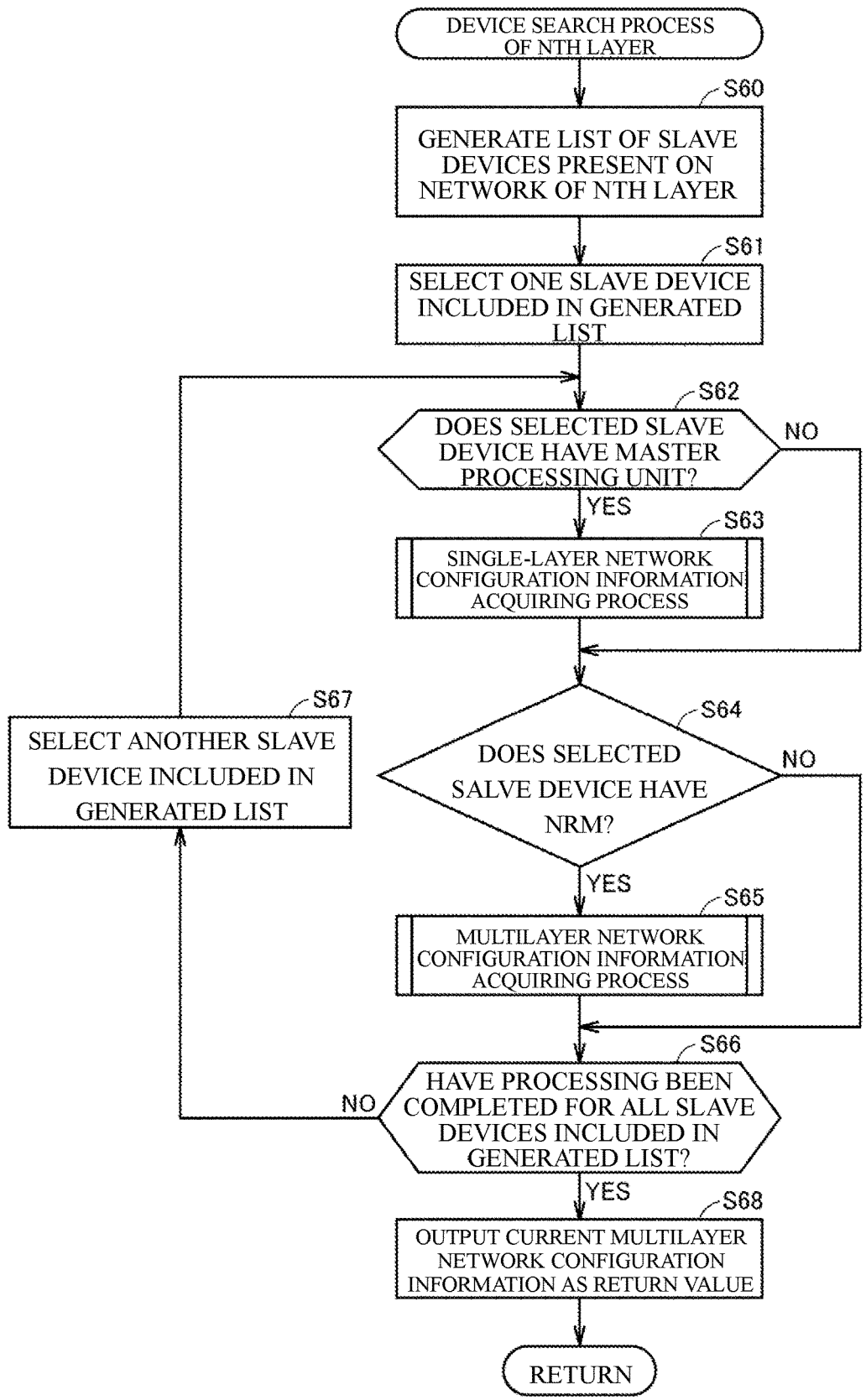
FIG. 17 is a flowchart showing a processing procedure of a device search process of the Nth layer shown in step S6 of FIG. 16.

FIG. 17 is a flowchart showing a processing procedure of the device search process of the Nth layer shown in step S6 of FIG. 16. Referring to FIG. 17, the network resource manager 140 analyzes the multilayer network configuration information of the Nth layer and generates a list of slave devices present on the Nth layer network (step S60). Then, the network resource manager 140 selects one slave device included in the generated list (step S61).

The network resource manager 140 determines whether or not the selected slave device has a master processing unit (step S62).

If the selected slave device has the master processing unit (YES in step S62), the network resource manager 140 performs a process of acquiring configuration information of a network managed by the master processing unit of the selected slave device (a single-layer network configuration information acquiring process) (step S63). Details of the single-layer network configuration information acquiring process will be described later.

If the selected slave device has no master processing unit (NO in step S62), step S63 is skipped.

Subsequently, the network resource manager 140 determines whether or not the selected slave device has a network resource manager 140 (step S64).

If the selected slave device has a network resource manager 140 (YES in step S64), the network resource manager 140 performs a process of acquiring multilayer network configuration information from the network resource manager 140 of the selected slave device (a multilayer network configuration information acquiring process) (step S65). Details of the multilayer network configuration information acquiring process will be described later.

If the selected slave device has no network resource manager 140 (NO in step S64), step S65 is skipped.

Subsequently, the network resource manager 140 determines whether or not the processing for all slave devices included in the list generated in step S60 has been completed (step S66).

If the processing for all slave devices included in the list generated in step S60 has not been completed (NO in step S66), the network resource manager 140 selects another slave device included in the generated list (step S67). Then, the processing of step S62 onward is repeated.

If the processing has been completed for all slave devices included in the list generated in step S60 (YES in step S66), the current multilayer network configuration information is output as a return value (step S68) and the process returns to that of FIG. 16.

Figure 18:
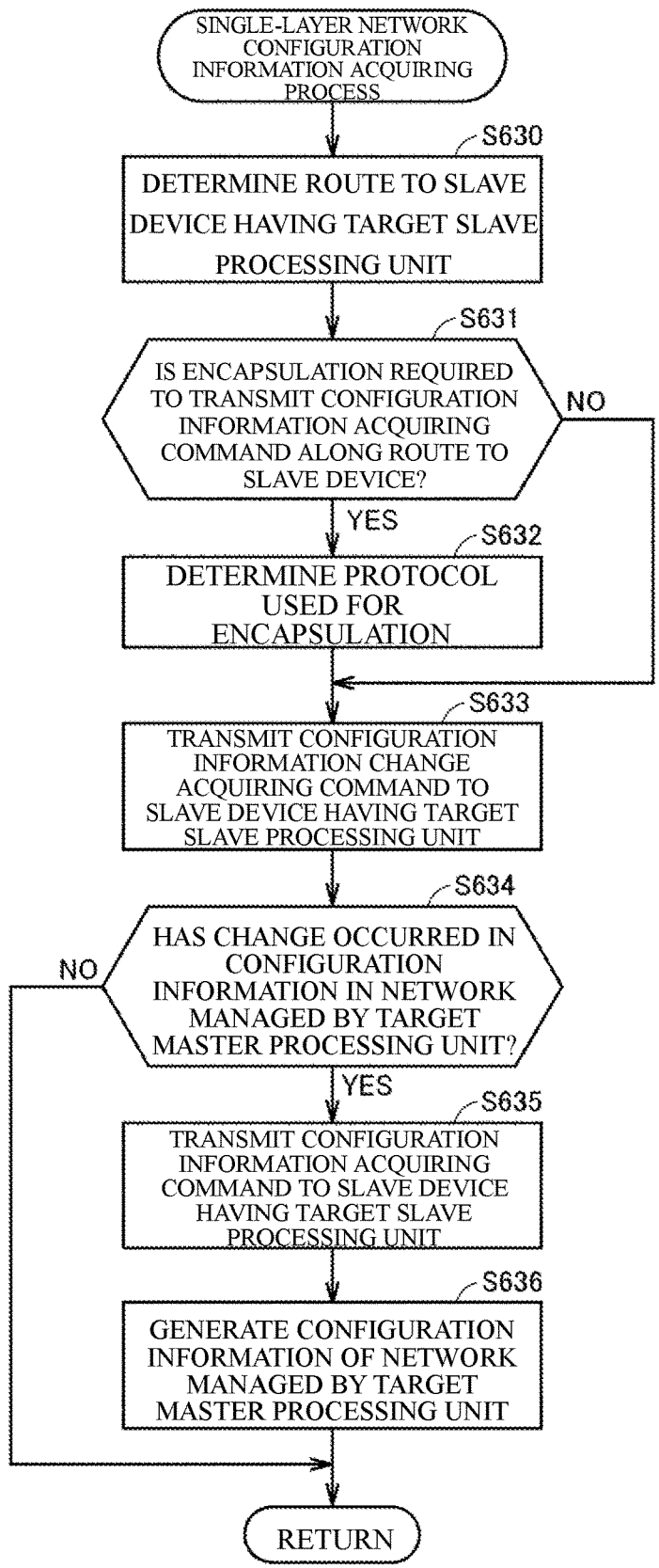
FIG. 18 is a flowchart showing a processing procedure of a single-layer network configuration information acquiring process shown in step S63 of FIG. 17.

FIG. 18 is a flowchart showing a processing procedure of the single-layer network configuration information acquiring process shown in step S63 in FIG. 17. Referring to FIG. 18, the network resource manager 140 determines a route to a slave device having a target slave processing unit on the basis of multilayer network configuration information created up to the current time (step S630). Then, the network resource manager 140 determines whether or not encapsulation is required to transmit a configuration information acquiring command along the route to the slave device determined in step S630 (step S631). That is, if different types of protocols are mixed in one or a plurality of networks present on the route from the network resource manager 140 to the target slave device, encapsulation for supporting data transmission in different protocols is performed.

If encapsulation is required to transmit the configuration information acquiring command along the route to the slave device determined in step S630 (YES in step S631), the network resource manager 140 determines a protocol used for encapsulation (step S632).

If no encapsulation is required to transmit the configuration information acquiring command along the route to the slave device determined in step S630 (NO in step S631), the process of step S632 is skipped.

Subsequently, the network resource manager 140 transmits a configuration information change acquiring command to the slave device having the target slave processing unit (step S633). Here, the configuration information change acquiring command is encapsulated as necessary. Then, on the basis of a response to the configuration information change acquiring command, the network resource manager 140 determines whether or not a change has occurred in configuration information in the network managed by the target master processing unit (step S634).

If no change has occurred in the configuration information in the network managed by the target master processing unit (NO in step S634), the process returns to that of FIG. 17. In this case, the network resource manager 140 uses the previously generated multilayer network configuration information as it is.

On the other hand, if a change has occurred in the configuration information in the network managed by the target master processing unit (YES in step S634), the network resource manager 140 transmits a configuration information acquiring command to the slave device having the target slave processing unit (step S635). Here, the configuration information acquiring command is encapsulated as necessary.

Then, on the basis of a response to the configuration information acquiring command, the network resource manager 140 generates configuration information of the network managed by the target master processing unit (step S636). Then, the process returns to that of FIG. 17.

Figure 19:
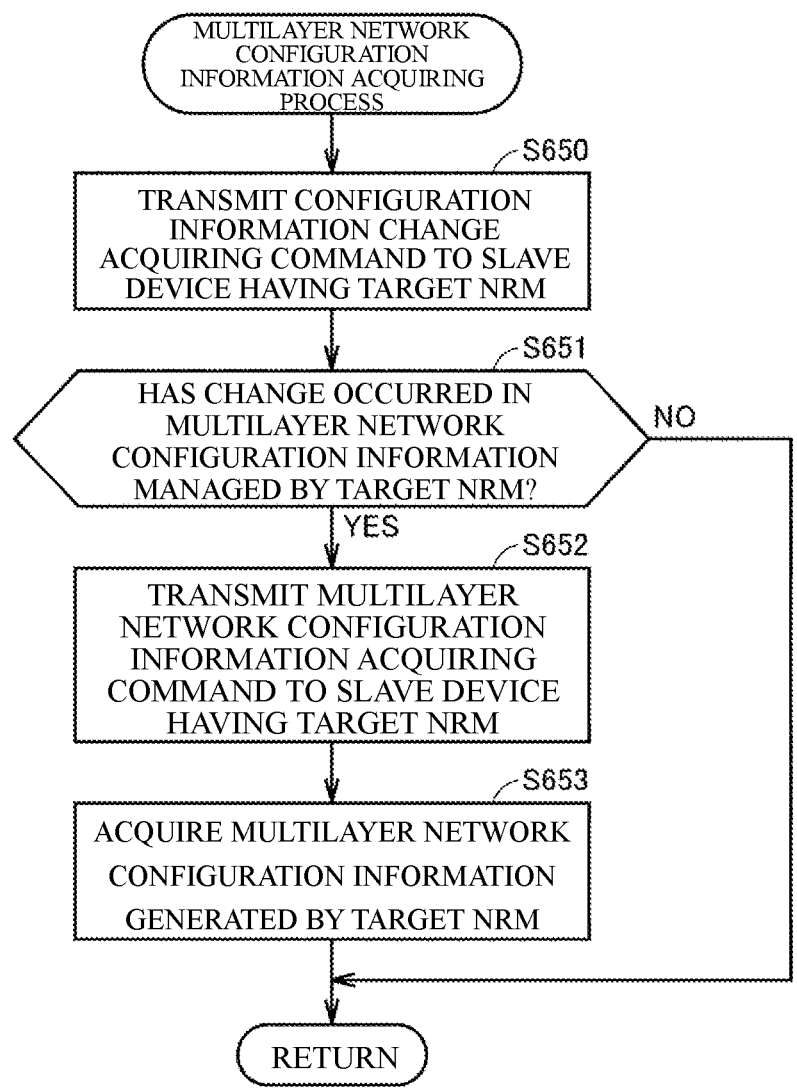
FIG. 19 is a flowchart showing a processing procedure of a multilayer network configuration information acquiring process shown in step S65 of FIG. 17.

FIG. 19 is a flowchart showing a processing procedure of the multilayer network configuration information acquiring process shown in step S65 of FIG. 17. Referring to FIG. 19, the network resource manager 140 transmits a configuration information change acquiring command to a slave device having a target network resource manager (step S650). Then, on the basis of a response to the configuration information change acquiring command, the network resource manager 140 determines whether or not a change has occurred in multilayer network configuration information managed by the target network resource manager 140 (step S651).

If no change has occurred in the multilayer network configuration information managed by the target network resource manager 140 (NO in step S651), the process returns to that of FIG. 17. In this case, the network resource manager 140 uses the previously acquired multilayer network configuration information as it is.

On the other hand, if a change has occurred in the configuration information in the network managed by the target master processing unit (YES in step S651), the network resource manager 140 transmits a multilayer network configuration information acquiring command to the slave device having the target network resource manager 140 (step S652).

Then, on the basis of a response to the multilayer network configuration information acquiring command, the network resource manager 140 acquires multilayer network configuration information generated by the target network resource manager 140 (step S653). Then, the process returns to that of FIG. 17.

(d5: Processing Procedure: Master Processing Unit)

Next, a processing procedure for a master processing unit included in a slave device will be described.

Figure 20:
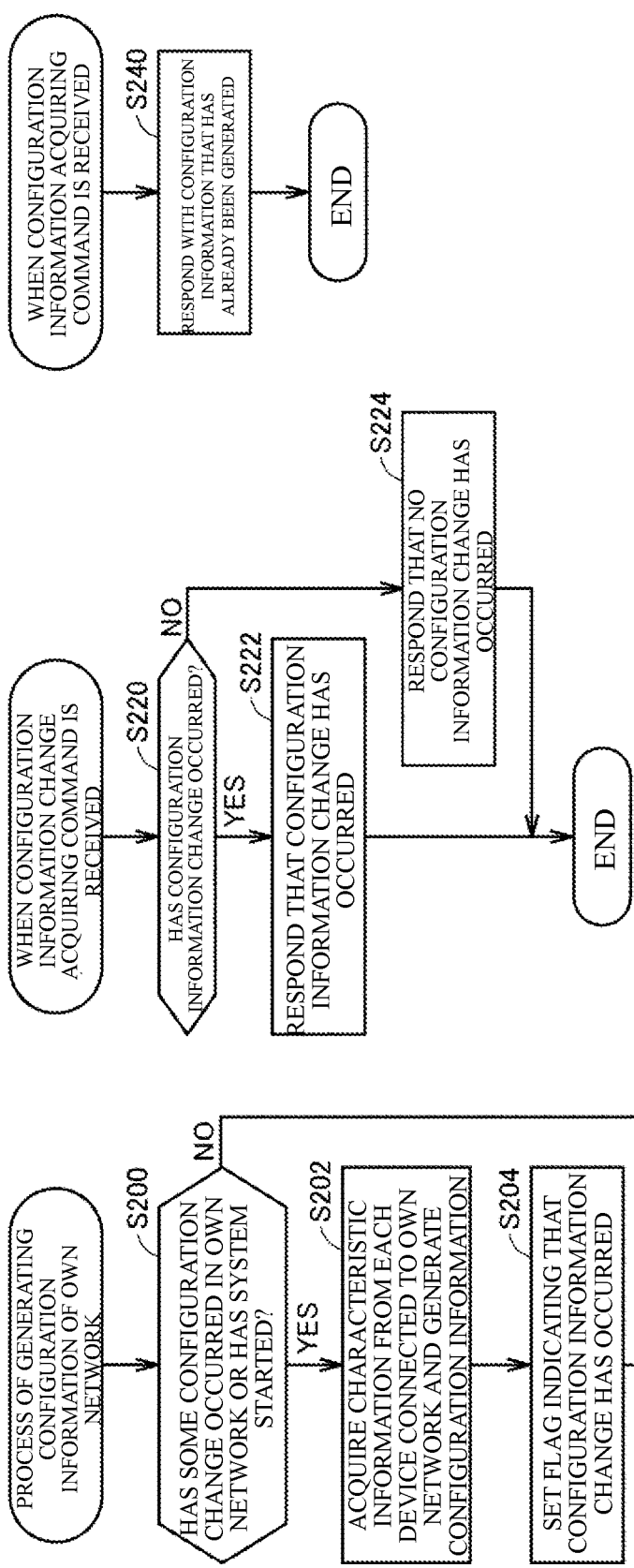
FIGS. 20(A) to 20(C) are flowcharts showing a processing procedure relating to a process of generating multilayer network configuration information by a master processing unit in the network system according to the present embodiment.

FIGS. 20(A) to 20(C) are flowcharts showing a processing procedure relating to a process of generating multilayer network configuration information by a master processing unit in the network system 1 according to the present embodiment. Each step shown in FIGS. 20(A) to 20(C) is typically realized by a processor of the slave device executing a system program.

FIG. 20(A) shows a processing procedure in which the master processing unit generates configuration information of its own network. Referring to FIG. 20(A), at the time of startup or when some configuration change occurs in the own network (YES at step S200), the master processing unit acquires characteristic information from each device connected to the own network and generates configuration information (step S202). Then, the master processing unit sets a flag indicating that a configuration information change has occurred as state information that is internally held (step S204). Then, the process is terminated.

It is to be noted that the processing procedure shown in FIG. 20(A) is performed at predetermined intervals or at predetermined events.

FIG. 20(B) shows a processing procedure when the master processing unit has received a configuration information change acquiring command from the network resource manager 140. Referring to FIG. 20(B), upon receiving a configuration information change acquiring command, the master processing unit refers to the value of the flag internally held and determines whether or not a configuration information change has occurred (step S220).

If the value of the flag held internally indicates that a configuration information change has occurred (YES in step S220), the master processing unit responds that a configuration information change has occurred (step S222). Then, the process is terminated.

On the other hand, if the value of the flag held internally indicates that no configuration information change has occurred (NO in step S220), the master processing unit responds that no configuration information change has occurred (step S224). Then, the process is terminated.

The processing procedure shown in FIG. 20(B) is performed each time a configuration information change acquiring command is received.

FIG. 20(C) shows a processing procedure when the master processing unit has received a configuration information acquiring command from the network resource manager 140. Referring to FIG. 20(C), upon receiving a configuration information acquiring command, the master processing unit responds with configuration information that has already been generated (step S240). Then, the process is terminated.

The processing procedure shown in FIG. 20(C) is performed each time a configuration information acquiring command is received.

<E. Encapsulation>

Next, data transmission in the case in which a transmission route spans a plurality of networks of different protocols will be described. In the case in which data transmission is performed over a plurality of networks complying with such different protocols, it is possible to employ an encapsulation method that adds a header according to the protocol of each network. That is, the network resource manager 140 transmits a command to acquire configuration information (single-layer network configuration information) by encapsulating the same in accordance with the protocols of networks present on a route to a target master processing unit from which the configuration information is to be acquired.

Figure 21:
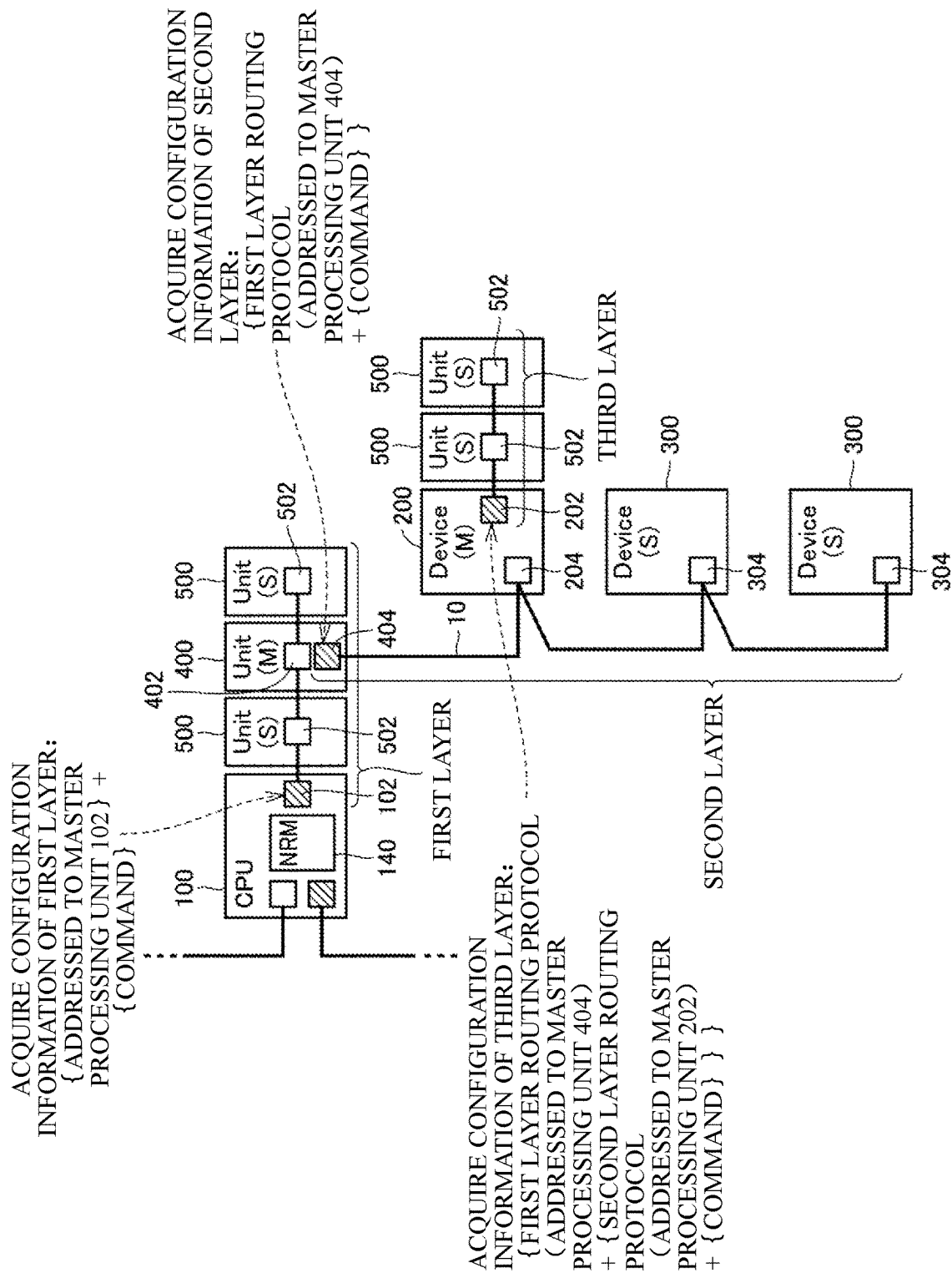
FIG. 21 is a diagram illustrating a method of transmitting a communication command through encapsulation in the network system according to the present embodiment.

FIG. 21 is a diagram illustrating a method of transmitting a communication command through encapsulation in a network system 1 according to the present embodiment. FIG. 21 shows a network system having three layers. It is assumed that networks of the layers are managed by a master processing unit 102 of the controller 100 (first layer), a master processing unit 404 of a master device 400 (second layer), and a master processing unit 202 of a master device 200 (third layer).

First, in the case in which the network resource manager 140 acquires configuration information of the first layer from the master processing unit 102, the network resource manager 140 transmits a communication frame (or packet) in which a communication command such as a configuration information acquiring command or a state monitoring command has been added to a header addressed to the master processing unit 102. Here, it is not needed to consider the protocol difference since this communication frame is transmitted within the controller 100.

Next, in the case in which the network resource manager 140 acquires configuration information of the second layer from the master processing unit 404, a communication frame is generated by adding a header addressed to the master processing unit 404 to the entirety of a communication frame in which a communication command has been added to a header addressed to the master processing unit 102. Such a process of adding a header addressed to a master processing unit located in the next layer to the entirety of a communication frame addressed to a master processing unit located in an upper layer is an example of the encapsulation.

Further, in the case in which the network resource manager 140 acquires configuration information of the third layer from the master processing unit 202, a communication frame is generated by adding a header addressed to the master processing unit 404 and also adding a header addressed to the master processing unit 202 to the entirety of a communication frame in which a communication command has been added to a header addressed to the master processing unit 102.

Headers according to protocols used in the networks of the target layers are employed as those shown in FIG. 21. Use of such encapsulation method ensures that, even when protocols used in networks of layers in multilayer networks are different, it is possible to realize transmission of communication commands or the like without considering the difference between the protocols.

<F. Exemplary Applications>

Next, some exemplary applications of the network system 1 according to the present embodiment will be described.

(f1: Distributed Arrangement and Centralized Management)

Figure 22:
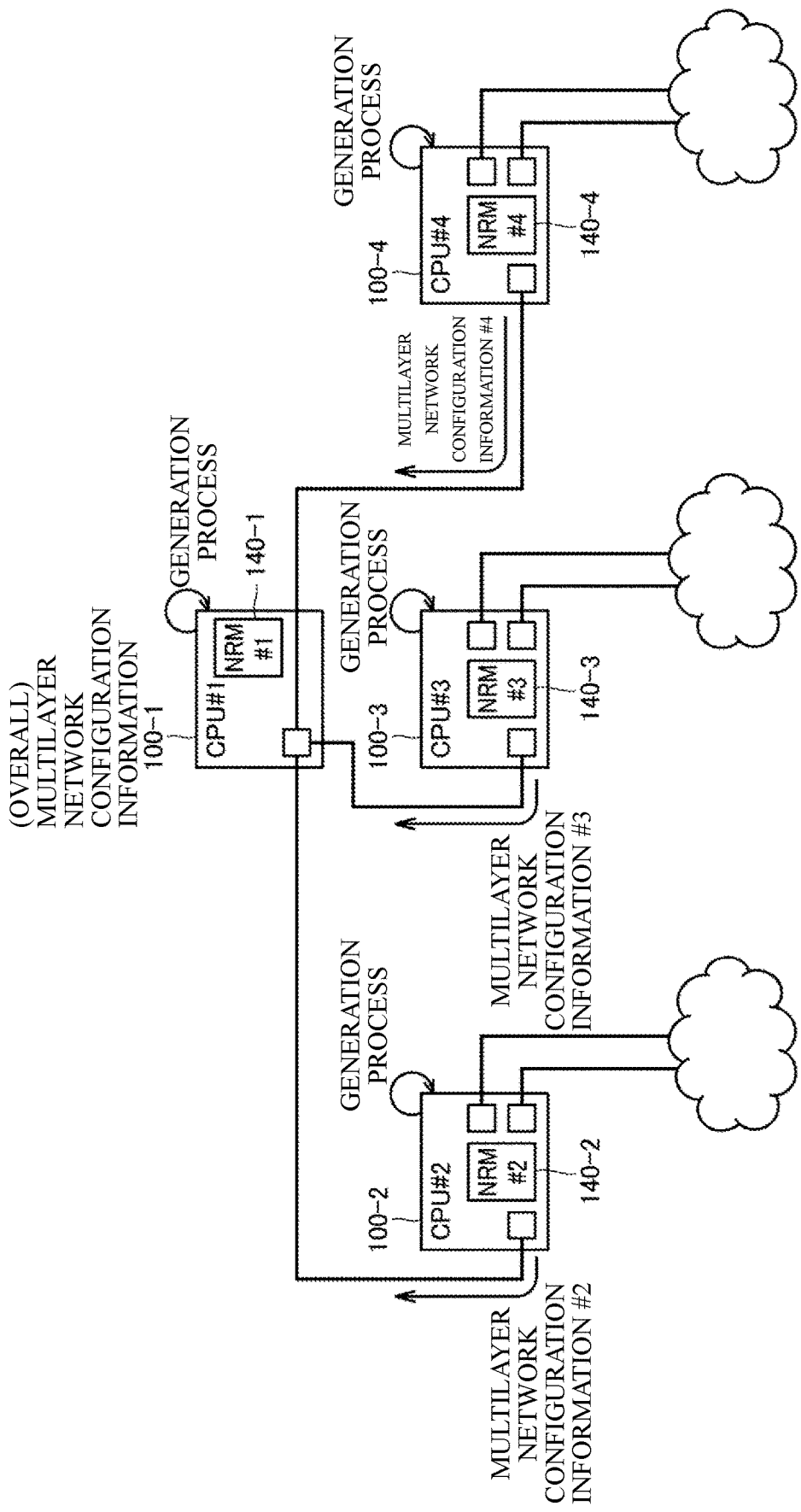
FIG. 22 is a schematic diagram showing an exemplary configuration when a plurality of networks of a plurality of network systems according to the present embodiment are centrally managed.

FIG. 22 is a schematic diagram showing an exemplary configuration when a plurality of networks of a network system according to the present embodiment are centrally managed. The network system shown in FIG. 22 includes four controllers 100-1 to 100-4. While the controller 100-1 performs overall processing, the remaining controllers 100-2 to 100-4 have their own networks to be managed.

In such a configuration, the controllers 100-2 to 100-4 have network resource managers 140-2 to 140-4, respectively. Each of the network resource managers 140-2 to 140-4 generates multilayer network configuration information for the network managed by the network resource manager.

The network resource manager 140-1 of the controller 100-1 acquires multilayer network configuration information from each of the network resource managers 140-2 to 140-4 and outputs (overall) multilayer network configuration information aggregated for the plurality of networks.

By using the multilayer network configuration information and the network resource manager 140 according to the present embodiment in such a manner, a plurality of controllers 100-2 to 100-4 as shown in FIG. 22 can be arranged in a distributed fashion and the controller 100-1 arranged as an overall controller can achieve centralized management by aggregating respective multilayer network configuration information of the controllers 100-2 to 100-4.

By adopting such a configuration with distributed arrangement and centralized management ensures, it is possible to provide transparent access to a device belonging to any network (that is, access not making the user conscious of which network the device belongs to).

(f2: Use in HMI Device 600 and Support Device 700)

In the network system according to the present embodiment, basically, multilayer network configuration information is generated by the network resource manager 140 of the controller 100. Such multilayer network configuration information can be used not only by an application executed on the controller 100 but can also be used outside the controller 100.

Typically, the HMI device 600 and/or the support device 700 connected to the controller 100 via the upper network 2 refers to the multilayer network configuration information generated by the controller 100 and accesses a target device to monitor the device status of the target device or to transfer various settings or the like to the target device. Alternatively, the HMI device 600 and/or the support device 700 can also present the connection relationships and topologies of devices in the network system to the user on the basis of the multilayer network configuration information acquired from the controller 100.

To acquire such multilayer network configuration information, the HMI device 600 and/or the support device 700 transmits a multilayer network configuration information acquiring command to a network resource manager 140 of any controller 100. In response to this multilayer network configuration information acquiring command, the network resource manager 140 responds with multilayer network configuration information that has already been generated.

It is to be noted that the network resource manager 140 may perform a process of generating multilayer network configuration information in an on-demand fashion, that is, may start the generating process after receiving a multilayer network configuration information acquiring command.

In this manner, the network resource manager 140 responds with the generated multilayer network configuration information 142 in response to a request from an external device. Adoption of such a function ensures that it is possible to improve the accessibility of the network system and the applicability of the application by providing an environment in which multilayer network configuration information can be used not only by the application executed by the controller 100 but can also be used outside the controller 100.

(f3: Modularization of Local Network)

With reference to the multilayer network configuration information generated in the network system 1 according to the present embodiment, it is possible to modularize a part of the network system 1 and to handle the modularized part.

Figure 23:
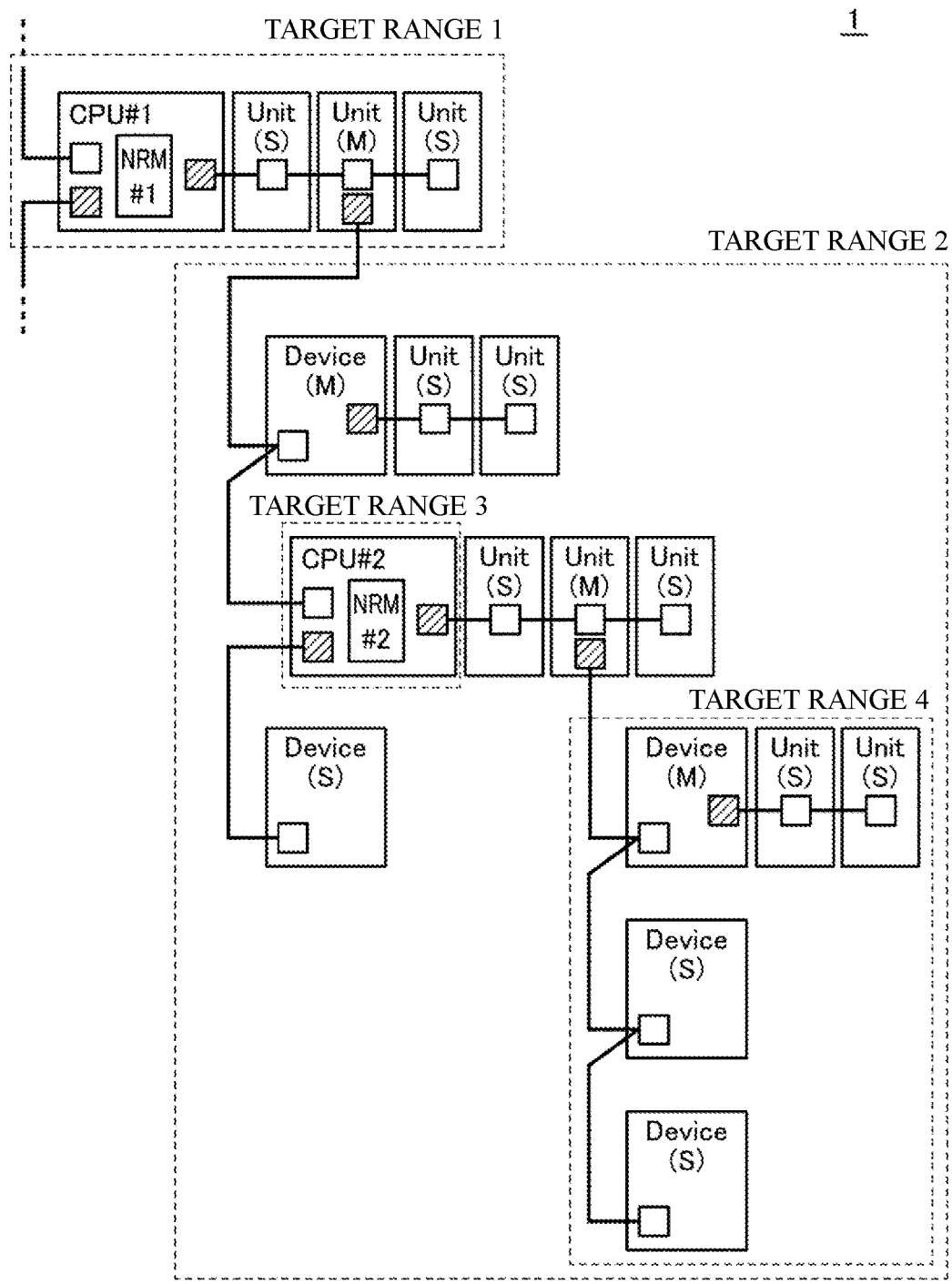
FIG. 23 shows an example of target ranges set in the network system according to the present embodiment.
Figure 24:
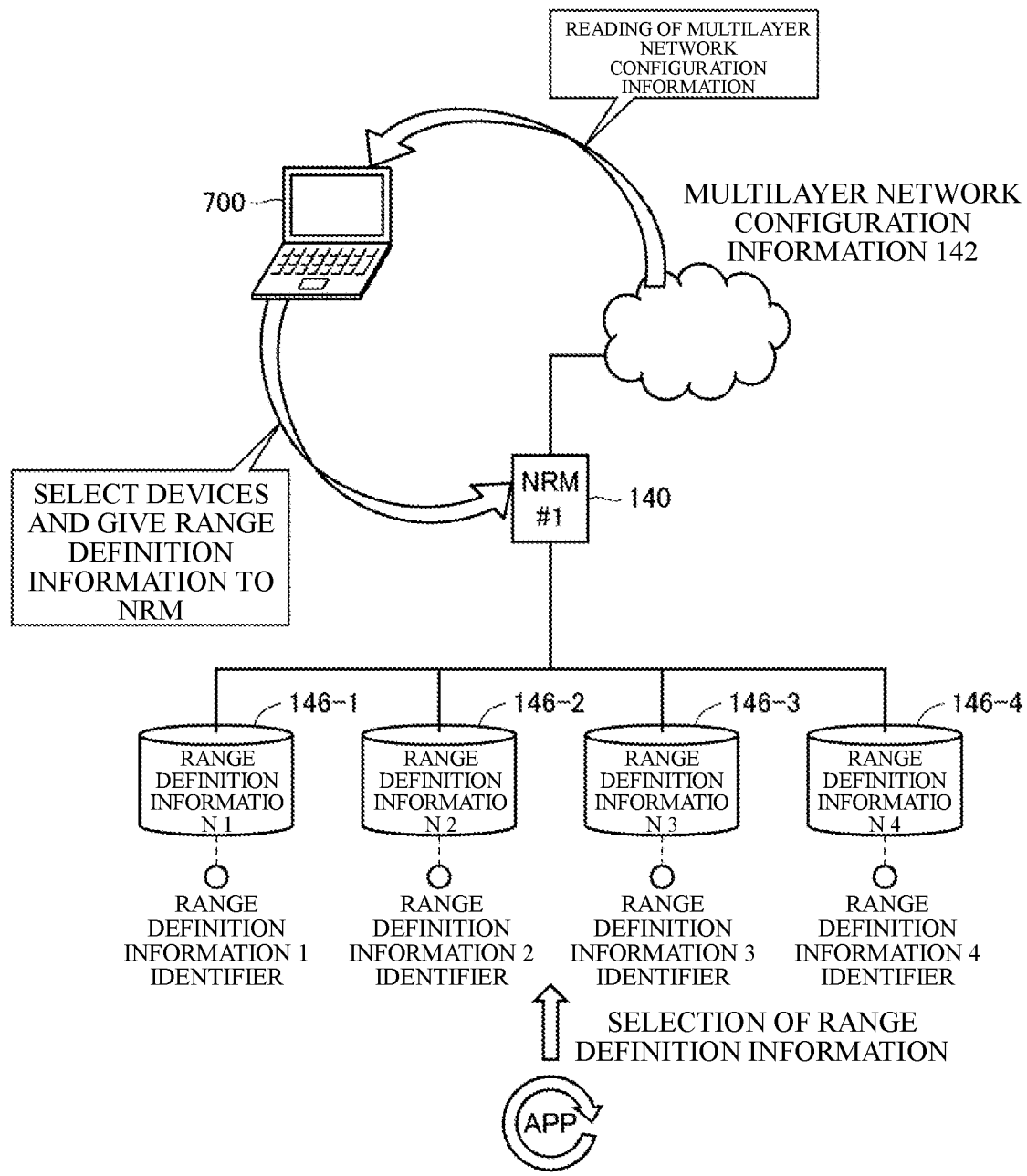
FIG. 24 is a diagram illustrating an example of a method of setting target ranges in the network system according to the present embodiment.

FIG. 23 shows an example of target ranges set in the network system 1 according to the present embodiment. FIG. 24 is a diagram illustrating an example of a method of setting target ranges in the network system 1 according to the present embodiment.

Referring to FIG. 23, target ranges can be arbitrarily set for the network system 1. Such target ranges can be used, for example, to define ranges of target devices to which some settings are to be given or ranges of target devices which are to be backed up.

More specifically, as shown in FIG. 24, for example, the user acquires multilayer network configuration information 142 from a network resource manager 140 using the support device 700 and selects one or a plurality of devices included in the network system 1 on the basis of the acquired multilayer network configuration information 142. Range definition information is generated in accordance with this selection. The generated range definition information is given from the support device 700 to the network resource manager 140.

In the example shown in FIG. 24, range definition information 146-1 to 146-4 corresponding to target ranges 1 to 4 shown in FIG. 23 is given to the network resource manager 140. The network resource manager 140 prepares identifiers associated with the range definition information 146-1 to 146-4 as an interface.

By selecting an identifier provided by the network resource manager 140 and giving an arbitrary command, an arbitrary application of the controller 100 or another device can cause an arbitrary process to be performed in common for only devices included in a target range corresponding to the selected identifier.

That is, it is possible to perform a common process for one or a plurality of devices included in a specific range by merely selecting an identifier provided by the network resource manager 140 without the need to individually select target devices included in the network system 1. By providing such an interface that enables modularization of one or a plurality of devices, it is possible to reduce development man-hours of the application and to increase reusability of the application.

It is to be noted that all devices included in the network system 1 can be selected as a modularization target. When all the devices are set as a target range, it is possible to easily realize collective setting, collective backup, or the like.

<G. Supplementary Description>

The above embodiments of the disclosure include the following technical concepts.

[Configuration 1] A network system (1) having at least one network including a master processing unit (102, 104, 202, 404) and one or a plurality of slave processing units (204, 304, 402, 502), the network system including:

a first device (100) having the master processing unit;

a second device (200, 400) having the master processing unit and the slave processing unit; and a third device (300, 500) having the slave processing unit, wherein each of the first, second, and third devices is configured to hold characteristic information (1166, 2166, 3166, 4166, 5166) indicating whether or not the device has the master processing unit or the slave processing unit, each master processing unit includes a device search unit (1022, 1042, 2022, 4042) configured to acquire the characteristic information from each of one or a plurality of slave processing units connected to a network managed by the master processing unit and to generate single-layer network configuration information (1021, 1041, 2021, 4041) indicating information of a device connected to each network, and the first device includes a network management unit (140) configured to acquire single-layer network configuration information from each master processing unit included in the network system to generate multilayer network configuration information (142) indicating a connection relationship of each device in the network system.

[Configuration 2] The network system according to configuration 1, wherein the network management unit is configured to specify a second device connected to a first network managed by the first device by referring to single-layer network configuration information generated by the master processing unit of the first device (SQ22, SQ24, SQ26, SQ28), and to acquire single-layer network configuration information of a second network managed by the specified second device by referring to single-layer network configuration information generated by a master processing unit of the specified second device (SQ30, SQ32, SQ34).

[Configuration 3] The network system according to configuration 2, wherein the network management unit is configured to specify a second device connected to the second network by referring to the single-layer network configuration information of the second network (SQ36), and to acquire single-layer network configuration information of a third network managed by the specified second device by referring to single-layer network configuration information generated by a master processing unit of the specified second device (SQ38, SQ40).

[Configuration 4] The network system according to configuration 2 or 3, wherein the network management unit is configured to generate the multilayer network configuration information by associating single-layer network configuration information acquired from each master processing unit included in the network system on the basis of a position of a second device present on each network.

[Configuration 5] The network system according to any one of configurations 1 to 4, wherein the characteristic information includes information (1667) indicating a type of a protocol supported by each device, information (1660) indicating presence or absence of a master processing unit, and information (1668) indicating presence or absence of a network management unit according to a predetermined format.

[Configuration 6] The network system according to any one of configurations 1 to 5, wherein the network management unit is configured to transmit a command to acquire single-layer network configuration information by encapsulating the command in accordance with a protocol of a network present on a route to a target master processing unit from which single-layer network configuration information is to be acquired.

[Configuration 7] The network system according to any one of configurations 1 to 6, wherein the network management unit is configured to search for devices included in the network system within a range defined by a preset search range setting (144-1 to 144-3).

[Configuration 8] The network system according to any one of configurations 1 to 7, wherein the network system includes a plurality of first devices, and the network management unit is configured to, when identifying a network management unit included in another first device, request multilayer network configuration information generated by the identified network management unit from the identified network management unit.

[Configuration 9] The network system according to any one of configurations 1 to 8, wherein the network management unit is configured to respond with generated multilayer network configuration information iii response to a request from an external device (600, 700).

[Configuration 10] A control method for a network system (1) having at least one network including a master processing unit (102, 104, 202, 404) and one or a plurality of slave processing units (204, 304, 402, 502), wherein the network system includes a first device (100) having the master processing unit, a second device (200, 400) having the master processing unit and the slave processing unit, and a third device (300, 500) having the slave processing unit, and each of the first, second, and third devices is configured to hold characteristic information (1166, 2166, 3166, 4166, 5166) indicating whether or not the device has the master processing unit or the slave processing unit, the control method including:

each master processing unit acquiring the characteristic information from each of one or a plurality of slave processing units connected to a network managed by the master processing unit and generating single-layer network configuration information (1021, 1041, 2021, 4041) indicating information of a device connected to each network (SQ2 to SQ12), and the first device acquiring single-layer network configuration information from each master processing unit included in the network system to generate multilayer network configuration information indicating a connection relationship of each device in the network system (SQ22 to SQ40).

[Configuration 11] A control device (100) used in a network system (1) having at least one network including a master processing unit (102, 104, 202, 404) and one or a plurality of slave processing units (204, 304, 402, 502), wherein the control device has the master processing unit, the network system includes a first device (200, 400) having the master processing unit and the slave processing unit, and a second device (300, 500) having the slave processing unit, each of the control device, the first device, and the second device is configured to hold characteristic information (1166, 2166, 3166, 4166, 5166) indicating whether or not the device has the master processing unit or the slave processing unit, each master processing unit includes a device search unit (1022, 1042, 2022, 4042) configured to acquire the characteristic information from each of one or a plurality of slave processing units connected to a network managed by the master processing unit and to generate single-layer network configuration information (1021, 1041, 2021, 4041) indicating information of a device connected to each network, and the control device includes a network management unit (140) configured to acquire single-layer network configuration information from each master processing unit included in the network system to generate multilayer network configuration information indicating a connection relationship of each device in the network system.

<H. Effects>

According to a network system for FA of the present embodiment, it is possible to easily acquire the overall configuration of a controller and devices arranged in a distributed manner on one or a plurality of networks connected to the controller.

According to the related art, the overall configuration of such devices is such that the configuration of each device is searched for and whether each device is a master processing unit or a slave processing unit is identified on the basis of the model information (or profile code) of each device. According to such an identification method, each time a new type of unit is developed, it is needed to update the process of searching for the configuration of each device on the basis of the model information.

In addition, it is not possible to directly acquire the structure of a multilayered network and it is needed to acquire the configuration of a master processing unit from each master processing unit of each layer. Therefore, it takes much time to identify the configuration of the multilayered network and the processing is also complicated. Further, it is needed to implement processing logic for each environment.

Furthermore, no function of identifying networks of all layers at once is implemented in each controller and it is difficult for each controller to access terminal devices. Moreover, when a plurality of controllers are present in the network system, it is not possible to collectively transfer settings using the support device.

To address such problems, in the network system according to the present embodiment, each device is allowed to hold characteristic information, and a network resource manager which acquires characteristic information from each device and generates multilayer network configuration information is arranged in the controller.

Adoption of this configuration can solve problems such as those described above.

Specifically, even when a new type of unit (master or slave unit) has been developed, it is easy to deal with the new type. For example, it is unnecessary to implement the configuration of the device based on model information through hard coding. By allowing each device to hold characteristic infatuation, it has become unnecessary to carry out the work of updating programs that are executed by the HMI device 600 and the controller 100. It is also possible to reduce man-hours relating to the work of updating using the support device 700.

The controller itself can acquire overall multilayer network configuration of the network system. By using such a function, for example, a network configuration diagram of a target network system or the like can be displayed on the HMI device 600 or the support device 700. Further, for example, on the HMI device 600 or the support device 700, it is possible to realize monitoring of device states of all devices in the network system. Furthermore, settings can be collectively transferred from the support device 700 to arbitrary devices.

An arbitrary command can also be transmitted from the controller 100 to an arbitrary device. By using such transmission of an arbitrary command to an arbitrary device, it is possible to realize, for example, cancellation of an abnormality that has occurred in any device or a backup/restoration process for an arbitrary device.

In addition, the controller itself can identify all protocols present in the network system and can specify an access route to an arbitrary device in the network system in a shorter time. By using such a function, for example, it is possible to enhance the user-related functionality of the HMI device 600 or the support device 700. It is also possible to reduce man-hours for the setting operation of the user with respect to the HMI device 600 or the support device 700.

Further, in the network system according to the present embodiment, one or a plurality of devices can be grouped and devices included in each group can be access-controlled collectively. By using such a function, it is possible to more quickly perform cancellation of an abnormality that has occurred in an arbitrary device or a backup/restoration process for an arbitrary device.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A network system having a plurality of networks, each network comprising a master processing unit and one or a plurality of slave processing units, the network system comprising:

a first device having the master processing unit;

a second device having the master processing unit and the slave processing unit; and a third device having the slave processing unit, wherein each of the first device, the second device, and the third device is configured to hold characteristic information indicating whether or not the device has the master processing unit or the slave processing unit, each master processing unit respectively comprises a device search unit configured to acquire the characteristic information from each of the first device, the second device, and the third device connected to a network managed by the respective master processing unit and to generate single-layer network configuration information indicating information of a device connected to each network managed by the respective master processing unit, and the first device comprises a network management unit configured to acquire single-layer network configuration information from each master processing unit comprised in the network system to generate multilayer network configuration information indicating a connection relationship of each device in the network system.

2. The network system according to claim 1, wherein the network management unit is configured to specify a second device connected to a first network managed by the first device by referring to single-layer network configuration information generated by the master processing unit of the first device and to acquire single-layer network configuration information of a second network managed by the specified second device by referring to single-layer network configuration information generated by a master processing unit of the specified second device.

3. The network system according to claim 2, wherein the network management unit is configured to specify a second device connected to the second network by referring to the single-layer network configuration information of the second network and to acquire single-layer network configuration information of a third network managed by the specified second device by referring to single-layer network configuration information generated by a master processing unit of the specified second device.

4. The network system according to claim 2 wherein the network management unit is configured to generate the multilayer network configuration information by associating single-layer network configuration information acquired from each master processing unit comprised in the network system on the basis of a position of a second device present on each network.

5. The network system according to claim 3, wherein the network management unit is configured to generate the multilayer network configuration information by associating single-layer network configuration information acquired from each master processing unit comprised in the network system on the basis of a position of a second device present on each network.

6. The network system according to claim 1, wherein the characteristic information comprises information indicating a type of a protocol supported by each device, information indicating presence or absence of a master processing unit, and information indicating presence or absence of a network management unit according to a predetermined format.

7. The network system according to claim 2 wherein the characteristic information comprises information indicating a type of a protocol supported by each device, information indicating presence or absence of a master processing unit, and information indicating presence or absence of a network management unit according to a predetermined format.

8. The network system according to claim 3 wherein the characteristic information comprises information indicating a type of a protocol supported by each device, information indicating presence or absence of a master processing unit, and information indicating presence or absence of a network management unit according to a predetermined format.

9. The network system according to claim 4 wherein the characteristic information comprises information indicating a type of a protocol supported by each device, information indicating presence or absence of a master processing unit, and information indicating presence or absence of a network management unit according to a predetermined format.

10. The network system according to claim 1, wherein the network management unit is configured to transmit a command to acquire single-layer network configuration information by encapsulating the command in accordance with a protocol of a network present on a route to a target master processing unit from which single-layer network configuration information is to be acquired.

11. The network system according to claim 2, wherein the network management unit is configured to transmit a command to acquire single-layer network configuration information by encapsulating the command in accordance with a protocol of a network present on a route to a target master processing unit from which single-layer network configuration information is to be acquired.

12. The network system according to claim 3, wherein the network management unit is configured to transmit a command to acquire single-layer network configuration information by encapsulating the command in accordance with a protocol of a network present on a route to a target master processing unit from which single-layer network configuration information is to be acquired.

13. The network system according to claim 4 wherein the network management unit is configured to transmit a command to acquire single-layer network configuration information by encapsulating the command in accordance with a protocol of a network present on a route to a target master processing unit from which single-layer network configuration information is to be acquired.

14. The network system according to claim 5, wherein the network management unit is configured to transmit a command to acquire single-layer network configuration information by encapsulating the command in accordance with a protocol of a network present on a route to a target master processing unit from which single-layer network configuration information is to be acquired.

15. The network system according to claim 1, wherein the network management unit is configured to search for devices comprised in the network system within a range defined by a preset search range setting.

16. The network system according to claim 2, wherein the network management unit is configured to search for devices comprised in the network system within a range defined by a preset search range setting.

17. The network system according to claim 1, wherein the network system comprises a plurality of first devices, and
the network management unit is configured to, when identifying a network management unit comprised in another first device, request multilayer network configuration information generated by the identified network management unit from the identified network management unit.

18. The network system according to claim 1, wherein the network management unit is configured to respond with generated multilayer network configuration information in response to a request from an external device.

19. A control method for a network system having a plurality of networks, each network comprising a master processing unit and one or a plurality of slave processing units, wherein the network system comprises a first device having the master processing unit, a second device having the master processing unit and the slave processing unit, and a third device having the slave processing unit, and each of the first device, the second device, and the third device is configured to hold characteristic information indicating whether or not the device has the master processing unit or the slave processing unit, the control method comprising:
each master processing unit respectively acquiring the characteristic information from each of the first device, the second device, and the third device connected to a network managed by the respective master processing unit and generating single-layer network configuration information indicating information of a device connected to each network managed by the respective master processing unit, and
the first device acquiring single-layer network configuration information from each master processing unit comprised in the network system to generate multilayer network configuration information indicating a connection relationship of each device in the network system.

20. A control device for a network system having a plurality of networks, each network comprising a master processing unit and one or a plurality of slave processing units, wherein the control device has the master processing unit, the control device is configured to hold characteristic information indicating that the device has the master processing unit, the master processing unit comprises a device search unit configured to acquire characteristic information from each of one or a plurality of devices connected to a network managed by the master processing unit and to generate single-layer network configuration information indicating information of each of one or a plurality of devices connected to the network managed by the master processing unit, and the control device comprises a network management unit configured to acquire single-layer network configuration information from each master processing unit comprised in the network system to generate multilayer network configuration information indicating a connection relationship of each device in the network system.

* * * * *